(12) United States Patent
Stebbings et al.

(10) Patent No.: US 6,887,404 B2
(45) Date of Patent: May 3, 2005

(54) SECURITY MARKING SYSTEM AND METHOD FOR MINIMIZING PIRATING OF DATA ON DATA MEDIA INCLUDING COMPACT DISCS AND DIGITAL VERSATILE DISCS

(75) Inventors: David W. Stebbings, Washington, DC (US); James F. Fleming, Burke, VA (US)

(73) Assignee: Recording Industry Association of America, Washington, DC (US)

(*) Notice: Subject to any disclaimer, the term of this patent is extended or adjusted under 35 U.S.C. 154(b) by 262 days.

(21) Appl. No.: 10/044,960

(22) Filed: Jan. 15, 2002

(65) Prior Publication Data

US 2002/0081382 A1 Jun. 27, 2002

Related U.S. Application Data

(62) Division of application No. 09/448,409, filed on Nov. 23, 1999, now Pat. No. 6,477,134, which is a continuation of application No. PCT/US99/14621, filed on Jun. 29, 1999.
(60) Provisional application No. 60/091,036, filed on Jun. 29, 1998.

(51) Int. Cl.[7] .......................... B29D 11/00; B29C 45/00
(52) U.S. Cl. ..................... 264/1.33; 250/282; 264/107; 264/328.1; 425/542; 425/810
(58) Field of Search ............................... 264/1.33, 1.7, 264/1.36, 1.38, 106, 107, 328.1; 425/810, 542; 250/281, 282; 350/71; 369/272

(56) References Cited

U.S. PATENT DOCUMENTS

| | | | |
|---|---|---|---|
| 4,571,492 A | * | 2/1986 | Kane et al. ................. 250/303 |
| 4,765,655 A | * | 8/1988 | Crihan ......................... 283/70 |
| 4,961,077 A | | 10/1990 | Wilson et al. ............... 346/1.1 |
| 5,163,131 A | | 11/1992 | Row et al. ................... 395/200 |
| 5,625,816 A | | 4/1997 | Burdick et al. ............. 395/614 |
| 5,625,817 A | | 4/1997 | Wood et al. ................ 395/614 |
| 5,671,202 A | | 9/1997 | Brownstein et al. .......... 369/58 |
| 5,706,047 A | | 1/1998 | Lentz et al. ................ 347/262 |
| 5,706,266 A | | 1/1998 | Brownstein et al. .......... 369/58 |
| 6,063,468 A | * | 5/2000 | Aratani et al. ............. 428/64.1 |
| 6,099,930 A | * | 8/2000 | Cyr et al. .................. 428/64.1 |

OTHER PUBLICATIONS

Boxer, A., "Where Buses Cannot Go", IEEE Spectrum, Feb. 1995, pp. 41–45.
Barroso, L.A. et al., "RPM: A Rapid Prototyping Engine for Multiprocessor Systems", IEEE Computer, Feb. 1995, pp. 26–34.

* cited by examiner

*Primary Examiner*—Mathieu D. Vargot
(74) *Attorney, Agent, or Firm*—Irah H. Donner; Wilmer Cutler; Pickering Hale and Dorr LLP

(57) ABSTRACT

The present invention is a method and system of marking data media products by introducing a predetermined tracing substance constituting a security marking into a polycarbonate (or polystyrene) composition during the manufacturing stages of the polycarbonate material into a data media, such as a compact disc (CD) or digital versatile disc (DVD). This marking technique is useful in tracking pirated data and/or sources, such as CDs or DVDs, to thereby prevent future pirating of data. Using mass spectrometry, specific types and/or quantities of isotopes of each tracing substance, on a structural level, are used to indicate a specific marking and product identity characteristics, such as a specific lot number, batch number, manufacturer identity, shipping date and the like. The security marking is preferably invisible to the naked eye. The security marking technique is also useful for tracking, authenticating and quality control purposes.

17 Claims, 32 Drawing Sheets

DISC

| | |
|---|---|
| Playing time: | 74 minutes, 33 seconds maximum |
| Rotation: | Counter-clockwise when viewed from readout surface |
| Rotational speed: | 1.2–1.4 m/sec. |
| Track pitch: | 1.6 μm |
| Diameter: | 120 mm |
| Thickness: | 1.2 mm |
| Center hole diameter: | 15 mm |
| Recording area: | 46 mm–117 mm |
| Signal area: | 50 mm–116 mm |
| Material: | Any transparent material with 1.55 refraction index, such as polycarbonate |
| Minimum pit length: | 0.833 μm (1.2 m/sec.) to 0.972 μm (1.4 m/sec.) |
| Maximum pit length: | 3.05 μm (1.2 m/sec.) to 3.56 μm (1.4 m/sec.) |
| Pit depth: | Approx. 0.11 μm |
| Pit width: | Approx. 0.5 μm |

OPTICAL SYSTEM

| | |
|---|---|
| Standard wavelength: | $\lambda = 780$ nm (7,800Å) |
| Focal depth: | $\pm 2$ μm |

($\lambda/NA \leqq 1.75$ μm, $NA$: Numerical Aperture)

SIGNAL FORMAT

| | |
|---|---|
| Number of channels: | 2 channels (4-channel recording possible) |
| Quantization: | 16-bit linear quantization |
| Quantizing timing: | Concurrent for all channels |
| Sampling frequency: | 44.1 kHz |
| Channel bit rate: | 4.3218 Mb/sec. |
| Data bit rate: | 2.0338 Mb/sec. |
| Data-to-channel bit ratio: | 8:17 |
| Error correction code: | CIRC (with 25% redundancy) |
| Modulation system: | EFM |

FIG. 1
PRIOR ART

| COUNTRY | CURRENT ESTIMATED CAPACITY - ALL FORMATS (CD-ROM, CD-AUDIO, CD-VIDEO) (MILLION UNITS) | TOTAL LEGITIMATE DEMAND - ALL CD FORMATS (MILLION UNITS) |
|---|---|---|
| BULGARIA | 45.0 | 0.1 |
| CHINA | 200.0 | 26.0 |
| CZECH REPUBLIC | 45.0 | 5.0 |
| HONG KONG | 330.0 | 17.0 |
| ISRAEL | 50.0 | 6.0 |
| MALAYSIA | 90.0 | 4.0 |
| TAIWAN | 350.0 | 32.0 |
| MACAU | 100.0 | NEGLIGIBLE |

FIG. 9

IFPI PRIORITY COUNTRIES IN TERMS OF
DOMESTIC PIRACY LEVELS, 1996

| COUNTRY | PIRACY US$m | PIRACY LEVEL UNITS |
|---|---|---|
| RUSSIA | 350 | 70% |
| BRAZIL | 200 | 45% |
| CHINA | 165 | 54% |
| ITALY | 105 | 22% |
| INDIA | 100 | 30% |
| MEXICO | 70 | 50% |
| ARGENTINA | 65 | 30% |
| SAUDI ARABIA | 35 | 30% |
| GREECE | 22 | 25% |
| MALAYSIA | 18 | 20% |

FIG. 10

| LEVEL OF DOMESTIC PIRACY | | | | |
|---|---|---|---|---|
| | OVER 50% | 25-50% | 10-25% | LESS THAN 10% |
| EUROPE | BULGARIA<br>CIS<br>ROMANIA<br>RUSSIA | CYPRUS<br>GREECE<br>LATVIA<br>LITHUANIA<br>SLOVENIA | HUNGARY<br>ITALY<br>POLAND | AUSTRIA<br>BELGIUM<br>CZECH REPUBLIC<br>DENMARK<br>FINLAND<br>FRANCE<br>GERMANY<br>ICELAND<br>IRELAND<br>NETHERLANDS<br>NORWAY<br>PORTUGAL<br>SLOVAKIA<br>SPAIN<br>SWEDEN<br>SWITZERLAND<br>UK |
| MIDDLE EAST/<br>TURKEY | | BAHRAIN<br>EGYPT<br>KUWAIT<br>LEBANON<br>OMAN<br>QATAR<br>SAUDI ARABIA | ISRAEL<br>TURKEY | UAE |
| ASIA | CHINA<br>PAKISTAN | INDIA | HONG KONG<br>INDONESIA<br>MALAYSIA<br>PHILIPPINES<br>SINGAPORE<br>SOUTH KOREA<br>TAIWAN<br>THAILAND | JAPAN |
| AFRICA | COTE D'IVOIRE<br>KENYA | NIGERIA | GHANA<br>SOUTH AFRICA<br>ZIMBABWE | |
| AUSTRALASIA | | | | AUSTRALIA<br>NEW ZEALAND |
| LATIN AMERICA | BOLIVIA<br>ECUADOR<br>EL SALVADOR<br>HONDURAS<br>NICARAGUA<br>PANAMA<br>PARAGUAY<br>PERU | ARGENTINA<br>BRAZIL<br>COLOMBIA<br>MEXICO<br>URUGUAY<br>VENEZUELA | CHILE<br>COSTA RICA<br>GUATEMALA | |
| NORTH AMERICA | | | | CANADA<br>USA |

FIG. 11

SECURITY MARKING SYSTEM AND METHOD FOR MINIMIZING PIRATING OF DATA ON DATA MEDIA INCLUDING COMPACT DISCS AND DIGITAL VERSATILE DISCS

RELATED APPLICATION

This application is a divisional application of U.S. application Ser. No. 09/448,409 filed Nov. 23, 1999 now U.S. Pat. No. 6,447,134 which is a continuation of International Appplication No. PCT/US99/14621, filed Jun. 29, 1999, which in turn claims priority from U.S. Provisional Application No. 60/091,036, filed Jun. 29, 1998, each of which is incorporated herein by reference.

This application is also related to: U.S. Nonprovisional Application entitled, "Data Disc Modulation for Minimizing Pirating and/or Unauthorized Copying and/or Unauthorized Access of/to Data on/from Data Media including Compact Discs and Digital Versatile Discs", filed May 20, 1999, application Ser. No. 09/315,104; U.S. Nonprovisional Application entitled, "Method for Minimizing Pirating and/or Unauthorized Copying and/or Unauthorized Access of/to Data on/from Data Media including Compact Discs and Digital Versatile Discs, and System and Data Media for Same", filed May 20, 1999, application Ser. No. 09/315,012; and U.S. Nonprovisional Application entitled, "Method for Minimizing Pirating and/or Unauthorized Copying and/or Unauthorized Access of/to Data on/from Data Media including Compact Discs and Digital Versatile Discs, and System and Data Media for Same", filed May 20, 1999, application Ser. No. 09/315,102, all three of which are incorporated herein by reference.

FIELD OF INVENTION

This invention relates generally to anti-data pirating technology. More specifically, the invention relates to a method and system of marking data discs by introducing, into the polycarbonate material, a predetermined tracing substance known as a security marking during the manufacturing stage of the polycarbonate material. This marking technique is useful in tracking pirated data and/or sources, such as compact discs (CDs) or digital versatile discs (DVDs), to thereby prevent future pirating of data.

BACKGROUND OF THE INVENTION

There are two basic methods for recording sound and music—analog and digital. See e.g. Ken C. Pohlmann, "The Compact Disc", THE COMPUTER MUSIC & DIGITAL AUDIO SERIES, Volume 5. The above-mentioned audio series, which was published by A-R Editions, Inc., in Madison, Wis., is, along with all volumes therein, incorporated by reference.

In analog recording, the recording medium (a tape) varies continuously according to the sound signal. In other words, an analog tape stores sound signals as a continuous stream of magnetism. The magnetism, which may have any value within a limited range, varies by the same amount as the sound signal voltage.

In digital recording, the sound signal is sampled electronically and recorded as a rapid sequence of separately coded measurements. In other words, a digital recording comprises rapid measurements of a sound signal in the form of on-off binary codes represented by ones and zeros. In this digital system, zeros are represented by indentations or pits in a disc surface, and ones are represented by unpitted surfaces or land reflections of the disc, such that a compact disc contains a spiral track of binary codes in the form of sequences of minute pits produced by a laser beam.

Music that is input to a digital recording and the requisite series of reproduction processes, must pass through the recording side of a pulse code modulation (PCM) system. A master recording of the music is stored in digital form on a magnetic tape or optical disc. Once the magnetic tape has been recorded, mixed and edited, it is ready for reproduction as a CD. The CD manufacturer then converts the master tape to a master disc, which is replicated to produce a desired number of CDs. At the end of the PCM system is the reproduction side, the CD player, which outputs the prerecorded music.

If digital technology is used in all intermediate steps between the recording and reproduction sides of the PCM system, music remains in binary code throughout the entire chain; music is converted to binary code when it enters the recording studio, and stays in binary code until it is converted back to analog form when it leaves the CD player and is audible to a listener. In most CD players, digital outputs therefrom preserve data in its original form until the data reaches the power amplifier, and the identical audio information that recorded in the studio is thereby preserved on the disc.

Optical Storage

The physical specifications for a compact disc system are shown in Prior Art FIG. 1. They were developed jointly by Sony and Philips, and are defined in the standards document entitled *Red Book*, which is incorporated herein by reference. The CD standard is also contained in the International Electrotechnical Commission standard entitled, *Compact Disc Digital Audio System*, also incorporated herein by reference. Disc manufacturers, as well as CD player manufacturers, obtain a CD license to use these specifications.

All disc dimensions, including those pertaining to pit and physical formations, which encode data, are defined in the CD standard. For example, specifications information on sampling frequency, quantization word length, data rate, error correction code, and modulation scheme are all defined in the standard. Properties of the optical system that reads data from the disc using a leaser beam are also defined in the standard. Moreover, basis specifications relevant to CD player design is located in the signal format specifications.

Referring to Prior Art FIGS. 2 and 2B, the physical characteristics of the compact disc surface structure are described. Each CD is less than 5 inches in diameter whose track thickness is essentially thinner than a hair and whose track length averages approximately 3 and a half miles. The innermost portion of the disc is a hole, with a diameter of 15 mm, that does not hold data. The hole provides a clamping area for the CD player to hold the CD firmly to the spindle motor shaft.

Data is recorded on a surface area of the disc that is 35.5 mm wide. A lead-in area rings the innermost data area, and a lead-out area rings the outermost area. Both lead-in and lead-out areas contain non-audio data used to control the CD player. Generally, a change in appearance in the reflective data surface of a disc marks the end of musical information.

A transparent plastic substrate comprises most of the CD's 1.2 mm thickness. Viewing a magnified portion of the CD surface, as shown in Prior Art FIGS. 2A and 2B, the top surface of the CD is covered with a very thin metal layer of generally aluminum, silver or gold. Data is physically contained in pits impressed along the CD's top surface. Above this metalized pit surface and disc substrate lies another thin protective lacquer coating (10 to 30 micrometers). An identifying label (5 micrometers) is printed on top of the lacquer coating.

A system of mirrors and lenses sends a beam of laser light to read the data. A laser beam is applied to the underside of a CD and passes through the transparent substrate and back again. The beam is focused on the metalized data surface that is sandwiched or embedded inside the disc. As the disc rotates, the laser beam moves across the disc from the center to the edge. This beam produces on-off code signals that are converted into, for example, a stereo electric signal.

The Pit Track

Prior Art FIG. 3 shows a typical compact disc pit surface. Each CD contains a track of pits arranged in a continuous spiral that runs from the inner circumference to the outer edge. The starting point begins at the inner circumference because, in some manufacturing processes, tracks at the outer diameter of a CD is more generally prone to manufacturing defects. Therefore, CDs with shorter playing time provide a greater manufacturing yield, which has led to adoption of smaller diameter discs (such as 8 cm CD-3 discs) or larger diameter discs (such as 20 and 30 cm CD-Video discs).

Prior Art FIG. 4 shows a diagram of a typical track pitch. The distance between successive tracks is 1.6 micrometers. That adds up to approximately 600 tracks per millimeter. There are 22, 188 revolutions across a disc's entire signal surface of 35.5 millimeters. Hence, a pit track may contain 3 billion pits. Because CDs are constructed in a diffraction-limited manner—creating the smallest formations of the wave nature of light—track pitch acts as a diffraction grating; namely, by producing a rainbow of colors. In fact, CD pits are among the smallest of all manufactured formations.

The linear dimensions of each track on a CD is the same, from the beginning of a spiral to the end. Consequently, each CD must rotate with constant linear velocity (CLV), a condition whereby uniform relative velocity is maintained between the CD and the pickup.

To accomplish this, the rotational speed of a CD varies depending on the position of the pickup. The disc rotates at a playing speed which varies from 500 revolutions per minute at the center, where the track starts, to 200 revolutions per minute at the edge. This difference in speed is accounted for by the number of tracks at each position.

For example, because each outer track revolution contains more pits than each inner track revolution, the CD must be slowed down as it plays in order to maintain a constant rate of data. So, when the pickup is reading the inner circumference of the CD, the disc rotates at the higher speed of 500 rpm. And as the pickup moves outwardly towards the disc's edge, the rotational speed gradually decreases to 200 rpm. Thus, a constant linear velocity is maintained, such that all of the pits are read at the same speed. The CD player constantly reads from synchronization words from the data and adjusts the disc speed to keep the data rate constant.

A CD's constant linear velocity (CLV) system is significantly different from an LP's system. A major difference stems from the fact that a turntable's motor rotates at a constant velocity rate of 33⅓ grooves. This translates into outer grooves having a greater apparent velocity than inner grooves, probably explained by the occurrence that high-frequency responses of inner grooves is inferior to that of outer grooves. If a CD used constant angular velocity (CAV) as opposed to the CLV system, pits on the outside diameter would have to be longer than pits on the inner diameter of the disc. This latter scenario would result in decreased data density and decreased playing time of a CD.

Like constant linear velocity, light beam modulation is also important to the optical read-out system that decodes the tracks. See Prior Art FIG. 5. A brief theoretical discussion on the distinctions between pit and land light travel explains this point.

Generally, when light passes from one medium to another with a different index of refraction, the light bends and its wavelength changes. The velocity at which light passes is important, because when velocity is slow, the beam bends and focusing occurs. Owing to several factors, such as the refractive index, disc thickness and laser lens aperture, the laser beam's size on the disc surface is approximately 800 $\mu$m. However, the laser beam is focused to approximately 1.7 $\mu$m at the pit surface. In other words, the laser beam is focused to a point that is a little larger than a pit width. This condition minimizes the effects of dust or scratches on the CD's outer surface, because the size of dust particles or scratches are effectively reduced along with the laser beam. Any obstruction less than 0.5 ml are essentially insignificant and causes no error in the readout.

As previously noted, a CD's entire pit surface is metalized. In addition, the reflective flat surface between each pit, (i.e. a land), causes almost 90 percent of laser light to be reflected back into the pickup. Looking at a spiral track from a laser's perspective on the underside of a disc, as shown in Prior Art FIG. 5, pits appears as bumps. The height of each bump is generally between 0.11 and 0.13 $\mu$m, such that this dimension is smaller than the laser beam's wavelength (780 nanometers) in air. The dimension of the laser beam's wavelength in air is larger than the laser's wavelength (500 nanometers) inside the disc substrate, with a refractive index of 1.55. In short, the height of each bump is, therefore, one-quarter of the laser's wavelength in the substrate.

Scientifically, this means that light striking a land will travel twice as far than light striking a bump. This discrepancy in light travel distances serve to modulate the intensity of a light beam. This allows data physically encoded on the disc to be recoverable by the laser.

Also, the pits and intervening reflective lands on the disc's surface do not directly designate ones and zeros. Rather, it is each pit's edge, whether leading or trailing, that is a 1 and all areas in between, whether inside or outside a pit, that are designated as zeros. Still, each pit and reflective land lengths vary incrementally. The combinations of 9 different pit and land lengths of varying dimensions physically encode the data.

Presently, there are three principal types of optical storage media for which there may be a need to provide security for the data stored on the optical storage media. The first type is a read-only memory (ROM) media where the disc is manufactured with the information already stored thereon in the form of depressions formed in the polycarbonate substrate. Read-only discs include CD-audio, CD-ROM, CD-interactive and CD-video discs.

The second type of optical storage media is a writable optical storage disc, which has the capability of having information recorded (or written) thereon after fabrication of the media.

And the third type is a re-writable or erasable optical storage disc, which has the capability of having information erased or modified after fabrication of the media.

In general, it is desired that the disc containing information is provided with a security marking or marker that is permanent, unalterable without damaging the disc medium, and could be determined by and/or related to the marking. The following prior patents represent the state of the art.

U.S. Pat. No. 4,961,077 to Wilson et al., incorporated herein by reference, discloses a method of affixing information characters on read-only optical discs by means of a pulsed scanning laser beam, which transmits light in a patterned array through a transparent layer of the medium, and indelibly marks the reflective layer of the medium without disrupting the surface continuity of the substrate and protective layer.

U.S. Pat. No. 5,625,816 to Burdick et al., incorporated herein by reference, discloses a method and system for tracking a manufactured product or group of manufactured products through a manufacturing process comprising a series of manufacturing steps performed at different physical locations.

U.S. Pat. No. 5,671,202 to Brownstein et al. relates to a method for providing security for the data stored in the optical information storage and retrieval system. The increased system security is provided by the inclusion in the medium of a visible and indelible identifying code and the storage of related data files on the storage medium. The visible identifying code is used in conjunction with the related files by the apparatus accessing the data files to protect the data files stored on the media against unauthorized access to the data files and/or unauthorized copying of the data files.

In U.S. Pat. No. 5,706,047 to Lentz et al., incorporated herein by reference, the invention relates generally to media upon which information is stored in an optical information storage and retrieval unit, and more particularly, to the inclusion in the media of an indelible identifying code embedded therein.

U.S. Pat. No. 5,706,266 to Brownstein et al., incorporated herein by reference, relates to a writable optical storage disc used in an optical information storage and retrieval system to provide security for the data stored in the storage and retrieval system.

The problem in one or more of the prior art references, I have determined, is that identification markings have been applied to the surface of the disc by means of mechanical disruption of the surface or by deposition of legible material on the surface. This information, however, being on the disc's surface can be compromised either accidentally or intentionally.

An additional problem in one or more of the prior art references is that the marking process is too sensitive to the energy level of the laser beam, such that too small an energy in the laser beam will not provide an identifiable marking, and too much energy can disrupt the lacquer overcoat layer and/or the polycarbonate layer used to protect the reflective layer.

Yet another problem in one or more of the prior art references is that the affixing or identifying marking information is easily applied to exterior, non-information surfaces of the substrate or protective layer, such as by printing. However, because the labeling or patterns are on the surface of the disc, they are susceptible to damage, alteration and can be removed too easily.

Accordingly, I have determined that it is desirable to solve one or more of the above problems. For example, I have determined that it is desirable to provide a system and method where identification markings need not be applied to the surface of the disc by means of mechanical disruption of the surface or by deposition of legible material on the surface.

I have also determined that it is desirable to provide a marking process that is not significantly sensitive to the energy level of the laser beam, and that will not disrupt the lacquer overcoat layer and/or the polycarbonate layer used to protect the reflective layer.

It is also desirable to provide a marking mechanism and/or process where the labeling or marking of the disc is not susceptible to damage, alteration, detection and/or removal.

SUMMARY OF THE INVENTION

It is a feature and advantage of the present invention to provide a method and/or system for tracking and/or minimizing pirating of, or unauthorized access to, data media that is inexpensive.

It is another feature and advantage of the present invention to provide a method and/or system for tracking and/or minimizing pirating of, or unauthorized access to, data media that is capable of detecting a security marking that could be determined by and/or related to the security marking itself, for piracy related issues.

It is another feature and advantage of the present invention to provide a method and/or system for tracking and/or minimizing pirating of, or unauthorized access to, data media that is manageable and practical in its implementation.

It is another feature and advantage of the present invention to provide a method and/or system for tracking and/or minimizing pirating of, or unauthorized access to, data media that does not require significant additional hardware and/or software in its implementation.

It is another feature and advantage of the present invention to provide a method and/or system for tracking and/or minimizing pirating of, or unauthorized access to, data media that is unreadable by the human eye and is indelible in the sense that it is permanent and, for all practical purposes, unalterable without damaging the disc medium.

It is another feature and advantage of the present invention to provide a method and/or system for tracking and/or minimizing pirating of, or unauthorized access to, data media that is impressed into the disc during the injection molding operation.

It is another feature and advantage of the present invention to provide a method and/or system for tracking and/or minimizing pirating of, or unauthorized access to, data media that can be advantageously used to prevent unauthorized access to the data on the data disc; that is, for authentication purposes.

It is another feature and advantage of the present invention to provide a method and/or system for tracking and/or minimizing pirating of, or unauthorized access to, data media that provides an identifying marking for discs storing optical information that is both relatively insensitive to the power of the radiation beam and reduces damage to the optical disc.

It is another feature and advantage of the present invention to provide a method and/or system for tracking and/or minimizing pirating of, or unauthorized access to, data media that provides manufacturer identifier information, such as manufacturer identity, manufacture date, batch number and the like, useful for quality control purposes.

It is another feature and advantage of the present invention to provide a method and/or system for tracking and/or minimizing pirating of, or unauthorized access to, data media that provides product identifier information, such as lot or batch identity, shipping date, sender identity, recipient identity, manufacturer identity, manufacture date, and the like, to assist in tracking the origin of piracy related issues.

Consequently, a feature and advantage of the present invention is to inhibit disc piracy; that is to provide greatly enhanced security measures against CD or DVD pirating. The present invention is based, in part, on my discovery that an identifier marking can be embedded in each data disc using conventional hardware. The present invention is also based on my discovery that the identifier marking or tracing may be, for example, embedded in the data disc in a manner that inhibits its detection. The present invention is further based on my discovery that use of a marker embedded in a data disc, when the data disc is manufactured, reduces or simplifies the problem of determining or tracking where/ when the data disc was pirated, thereby making it practical to determine valuable information regarding the origin of pirating of the data disc.

The above features and advantages are accomplished generally by introducing a tracing or marking substance constituting a security marking into a polycarbonate composition during the manufacturing stage of the polycarbonate material into a data media, such as a CD or DVD. The tracing substance is preferably at the isotope level, where various different quantities of isotopes are used. Thus, various marking substances may be used.

Specific types and/or quantities of isotopes are used to indicate a specific marker, as described above, such as a specific lot, manufacturer and the like. The specific types and/or quantities of isotopes may be determinable with respect to each other and/or, alternatively, with respect to the total polycarbonate composition. Optionally, the type and/or quantities of isotopes may be determined by a specific order of composition. Advantageously, the isotope number(s) are detectable using spectrometry techniques.

According to the present invention, there are two alternative ways of identifying the tracing substance, as well as its structural composition, contained in the end-product ultimately made of the polycarbonate material. Each alternative method is easily employed via conventional spectrometry techniques.

One exemplary way is to perform a mass spectrometry analysis of the polycarbonate itself. If the polycarbonate includes one or two optically clear substances in, for example, crystalline form, this is evidence of a tracing substance, which is likely a heavy element.

Another method is to perform a mass spectrometry analysis of the polycarbonate, to determine or detect a heavy element and also to identify the ratio of the isotopes in a given element. The accuracy of the spectrometry, which is very high, would be a function of the ratio between the isotopes of the element itself.

Other methods may alternatively be used to detect a tracing substance embedded in the data disc that perform the similar overall intended function described herein.

The advantage of using one or more of the above two methods on a data medium, such as a compact disc, is that it eliminates an obvious method that a pirate could use to reproduce discs. That is, a pirate will have to initially fabricate a disc that meets the exact structural predetermined requirements of the disc to be copied, in order to be deemed a non-pirated disc.

The present invention employs methods of manufacturing traceable data discs that are a function of the structural characteristics of each disc that is relatively unchangeable after fabrication. Thus, another disc having the same structural or chemical characteristics is required in order for it to be considered an authenticated CD or DVD.

Another feature of the present invention is the combinative use of the above methods for generating a security marking in each data disc. For example, a single data disc may comprise the combination of one or more tracing substances where each tracing substance may constitute a separate and/or different security marking as desired, to indicate specific lot, polycarbonate or raw material manufacturer, date of manufacture, intended data disc presser/manufacturer, and the like, described in more detail below.

To achieve these and other objects, the present invention provides a computer program product that stores computer instructions thereon for instructing a computer to perform a process of tracking a data media, such as a CD or DVD, and determining whether it is fraudulent/pirated or non-fraudulent. Alternatively, the present invention provides a data disc having modified data stored thereon, including the tracing or marking substance(s).

In accordance with one embodiment of the invention, a method is disclosed for providing a security marking for a data disc product comprised of polycarbonate material and storing data thereon, such as CDs or DVDs. The method is used for tracking purposes to inhibit at least one of piracy, unauthorized access and unauthorized copying of the data stored on the data disc product.

The method includes the following sequential, non-sequential and/or sequence independent steps of introducing at least one predetermined tracing substance as a predetermined marking in the polycarbonate material of the data disc product in quantities that will not adversely affect at least one of performance, structure of, and the data stored on, the data disc product; and manufacturing the data disc product with the at least one predetermined tracing substance introduced therein said introducing step (a).

The introducing step (a) further comprises the step of introducing the at least one predetermined tracing substance as a security marking in the polycarbonate material including predetermined concentration amounts of at least one of an isotope, a plurality of isotopes and a plurality of stable isotopes.

Furthermore, the method encompasses a process wherein at least one predetermined tracing substance comprises at least two predetermined tracing substances, and wherein the introducing step (a) further comprises the step of introducing the at least two predetermined tracing substances as a security marking in the polycarbonate material including predetermined concentration amounts of at least one of an isotope, a plurality of isotopes and a plurality of stable isotopes.

Each tracing substance may comprise a transparent oxide of at least one of a silicate, a lead dioxide, tin cadmium 12 and iridium 5, or combination thereof.

The method also includes the step of identifying by inspecting the data disc product the at least one tracing substance for tracking purposes to inhibit at least one of piracy, unauthorized access and unauthorized copying of the data stored on the data disc product. Alternatively, the product could be identified on a basis of the ratio of concentration amounts of each tracing substance in the product, or on the basis of the ratio of concentration amounts of each tracing substance to the total polycarbonate composition of the product. Furthermore, the product could alternatively be identified on the basis of a specific composition of each tracing substance in the product.

The method also includes a step of attributing distribution of each data disc product to a manufacturer such that identification of each tracing substance in the data disc product indicates whether the manufacturer is an authorized manufacturer. The predetermined marking is substantially transparent.

In accordance with another embodiment of the invention, a method is disclosed for marking a protective layer of a product, which comprises at least one of a portion of a polymer, where the method is used to track the product and inhibit at least one of piracy, unauthorized access and unauthorized copying of the product.

The method according to this embodiment comprises the steps of introducing at least one predetermined tracing substance as a predetermined marking in the polycarbonate material of the protective layer of the product in quantities that will not adversely affect at least one of performance, structure of, and the data stored on, the produce; and manufacturing the product with the at least one predetermined tracing substance introduced therein in introducing step (a).

In yet another embodiment of the present invention is disclosed, in a security marking method for marking a polycarbonate-based product to inhibit at least one of piracy, unauthorized access and unauthorized copying of the product, a data disc impregnated with at least one predetermined tracing substance providing the security marking used for at least one of tracking and authenticating the data disc. Each predetermined tracing substance includes predetermined concentration amounts of at least one of an isotope, a plurality of isotopes and a plurality of stable isotopes, where the predetermined tracing substance is indicative of product information including at least one of a lot number, batch number, shipper, recipient, shipping date, manufacturer identity, manufacturing date and designated product purpose.

In accordance with another embodiment of the present invention is disclosed a system of marking a protective layer of a product, which comprises and includes at least one of a portion of polymer, where the system is used to track the product and inhibit at least one of piracy, unauthorized access and unauthorized copying of the product.

The system according to this embodiment comprises: means for introducing at least one predetermined tracing substance as a predetermined marking in the polycarbonate material of the protective layer of the product in quantities that will not adversely affect performance and/or structure and/or the data stored on the product; and means for manufacturing the product with the at least one predetermined tracing substance introduced therein by the means for introducing.

The marking system according to yet another embodiment of the present invention comprises: a substance introduction system introducing at least one predetermined tracing substance as a predetermined marking in the polycarbonate material of the product in quantities that will not adversely affect performance and/or structure and/or the data stored on the product; and a product manufacturing system, operatively and structurally responsive to the substance introduction system, and manufacturing the product with each predetermined tracing substance introduced therein by the substance introduction system.

In yet another embodiment of the present invention, the tracing substance, which can be introduced into any product that uses polycarbonate or polystyrene, serves as a security marking for a desired number of non-data disc products, such as CD cases, films, or MYLAR. In addition, the markings of the present invention may also be used in plexiglass, eyeglasses, sunglasses, helmets and the like.

In yet another embodiment of the present invention, the predetermined tracing substance constituting a security marking that is introduced into a polycarbonate composition during the manufacturing stage of the composition into CDs and DVDs, can also be used for authentication purposes in order to prevent unauthorized access to data on the disc.

In accordance with this embodiment of the invention, a method is disclosed for authenticating a data media in order to prevent piracy and/or unauthorized access and/or unauthorized copying of the data media, wherein the media is impregnated with at least one predetermined tracing substance including a predetermined concentration of at least one of an isotope, a plurality of isotopes and a plurality of stable isotopes, to form at least one security marking used for at least one of tracking and authenticating the data media.

The authenticating method here comprises the steps of: detecting at least one security marking in the data media; authenticating the data media responsive to the above detecting step using at least one security marking; and outputting the data stored on the data media as at least one of audio, video, audio data, video data and digital data substantially free of each security marking when the data media has been successfully authenticated by the above authenticating step.

The authenticating method further includes the steps of authenticating the data media via at least two different security markings, each of which successively must be authenticated before the data is finally output via the outputting step, and of authenticating the data media over a plurality of interconnected computer networks comprising at least one of a local network, global network and Internet.

In yet another embodiment is disclosed, in a security marking method for marking a polycarbonate-based product to prevent piracy and/or unauthorized access and/or unauthorized copying of the product, a data disc impregnated with at least one predetermined tracing substance providing a security marking used for tracking and/or authenticating the data disc. Each predetermined tracing substance includes predetermined concentration amounts of at least one isotope, a plurality of isotopes and a plurality of stable isotopes. The predetermined tracing substance is indicative of product information including at least one of a lot number, batch number, shipper, recipient, shipping date, manufacturer identity, manufacturing date and designated product purpose.

Finally, in accordance with another embodiment of the present invention, a data message is disclosed. In a security marking method for marking a polycarbonate-based product to prevent piracy and/or unauthorized access and/or unauthorized copying of the product, a data disc is impregnated with at least one predetermined tracing substance providing a security marking used for tracking and/or authenticating the data disc. Each predetermined tracing substance includes predetermined concentration amounts of at least one isotope, a plurality of isotopes and a plurality of stable isotopes. The predetermined tracing substance is indicative of product information including at least one of a lot number, batch number, shipper, recipient, shipping date, manufacturer identity, manufacturing date and designated product purpose.

A computer or processor driven system, tangible medium including instructions thereon, and process is also provided.

There has thus been outlined, rather broadly, the important features of the invention in order that the detailed description thereof that follows may be better understood, and in order that the present contribution to the art may be better appreciated. There are, of course, additional features of the invention that will be described hereinafter and which will perform the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purposes of description and should not be regarded as limiting.

As such, those skilled in the art will appreciate that the conception, upon which this disclosure is based, may readily be used as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public, generally, and especially scientists, engineers and practitioners in the art, who are not familiar with patent or legal terms or phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter, which illustrate preferred embodiments of the invention.

BRIEF DESCRIPTION OF THE DRAWINGS

FIG. 1 shows a conventional specification table for a conventional compact disc system.

FIG. 9 shows eight (8) countries where music piracy is of particular concern, along with data on the estimated capacity for manufacturing all data discs, and data on legitimate demand for all data discs.

FIG. 10 is a tabular listing of 10 countries and data on reported instances of piracy in 1996.

FIG. 11 shows different levels of domestic piracy (in units) for Europe, the Middle East/Turkey, Asia, Africa, Australasia, Latin America and North America.

The same reference numerals refer to the same parts throughout the various Figures.

NOTATIONS AND NOMENCLATURES

Figure 2A:
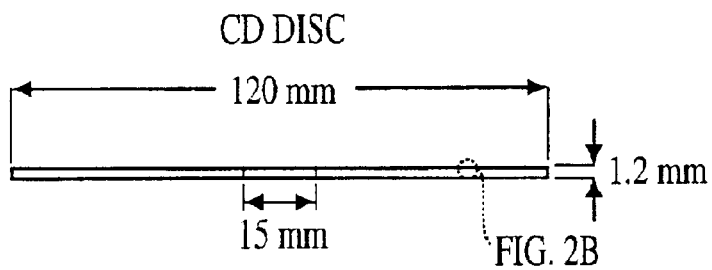
FIGS. 2A and 2B, show a scale drawing of a conventional CD data surface.
Figure 2B:
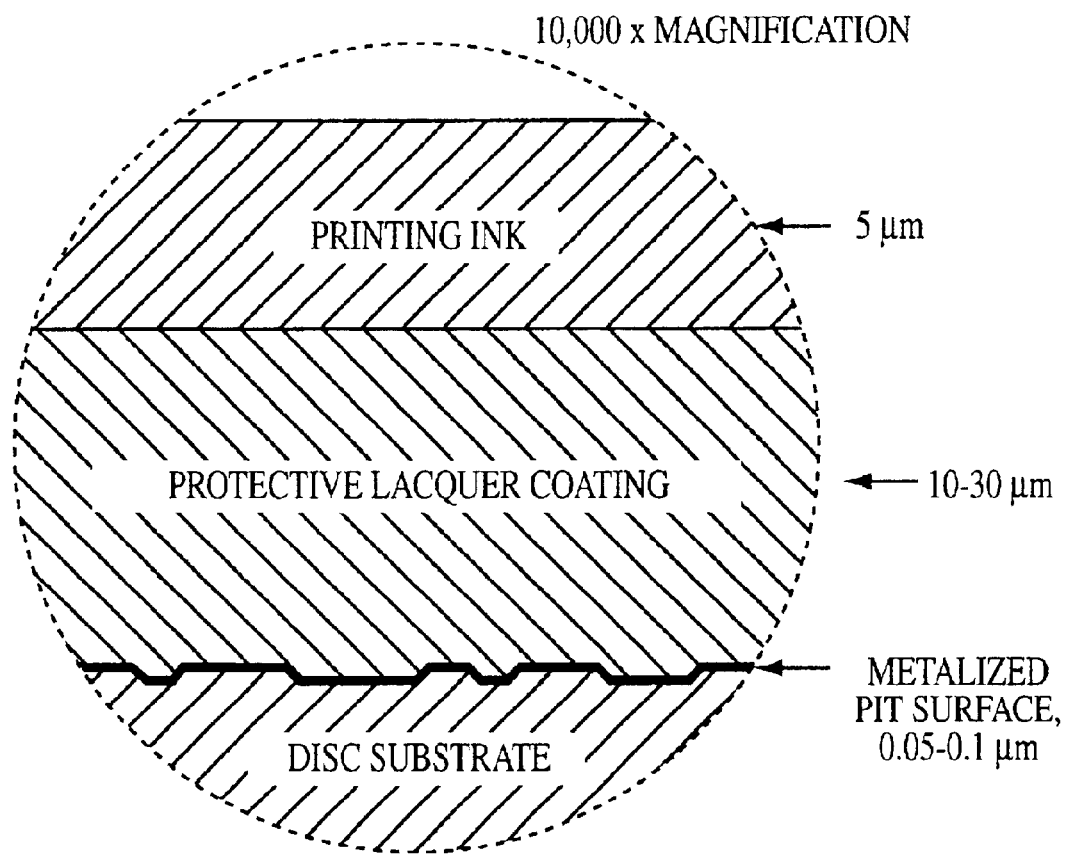
Figure 3:
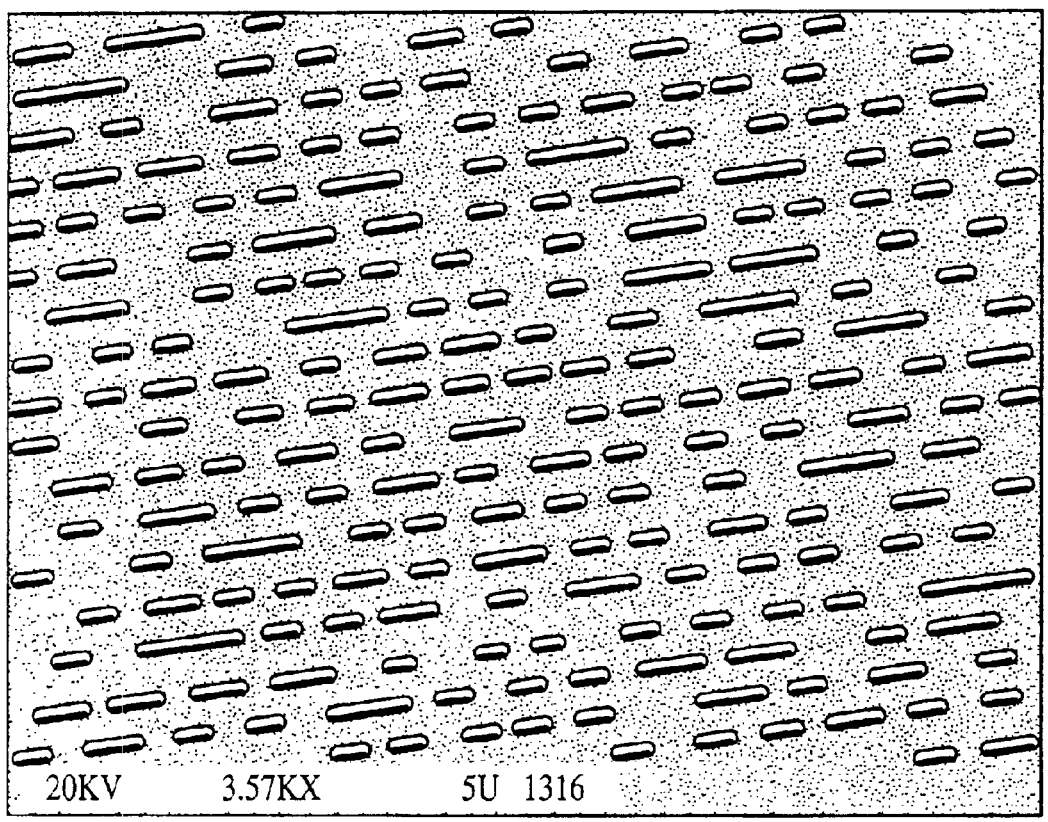
FIG. 3 shows a typical compact disc pit surface.
Figure 4:
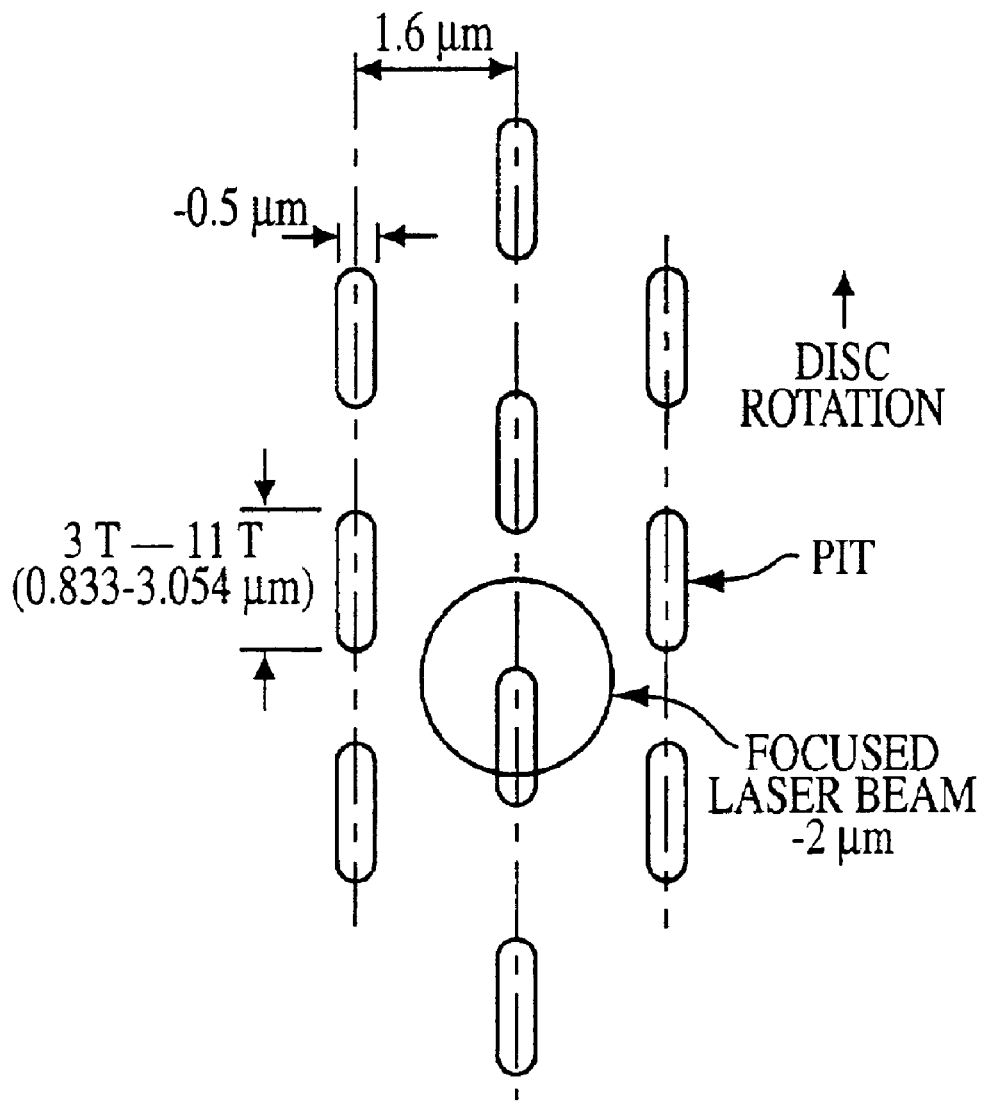
FIG. 4 shows a diagram of a conventional pit track.
Figure 5:
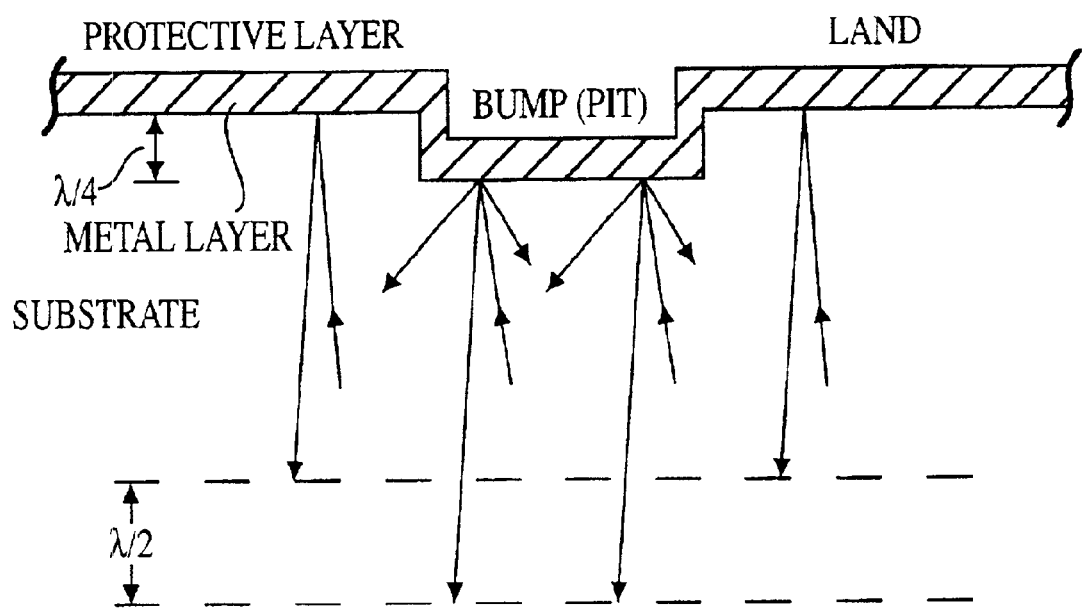
FIG. 5 shows a conventional bump height on a CD surface.

The detailed description that follows may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to an apparatus for performing these operations. This apparatus may be specially constructed for the required purpose or it may comprise a general purpose computer as selectively activated or reconfigured by a computer program stored in a computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENTS

The present invention relates generally to a method of marking products by introducing, into the polycarbonate composition, a predetermined substance during the manufacturing stage of the product.

One application of the above is directed to the manufacture of data discs, such as CDs and DVDs, where there is a need for improved security against piracy. Hence, this marking technique is helpful in preventing piracy of data, such as audio and/or video data from data sources, such as CDs and DVDs.

The specific types and/or quantities of isotopes of each tracing substance are used to indicate a specific marker, as described above, such as a specific lot number, batch number, manufacturer identity, shipping date, shipper, recipient and the like. The specific types and/or quantities of isotopes may be determinable with respect to each other and/or, alternatively, with respect to the total polycarbonate composition.

Optionally, the types and/or quantities of isotopes may be determined by a specific order of composition. Advantageously, the isotope number(s) is/are detectable using conventional spectrometry techniques.

In this regard, the present invention is grounded on the idea that data discs can be marked with one or more identifiers at a structural level with, for example, a substance introduced into the polycarbonate or polystyrene composition that comprises each disc. Each disc can then be later distributed with one or more dissimilar identifiers or markings, which are preferably and optionally invisible to the eye and transparent. Additionally, the markings would not affect the optical qualities of the polycarbonate.

Generally, very small quantities of a tracing substance described below are introduced into the polycarbonate, polystyrene and the like, composition. With respect to the issue of detecting a security marking that could be determined by and/or related to the marking, there are several conventional techniques that are useful for substance identification and structure determination. An exemplary technique is mass spectrometry. Then, a mass spectrometry analysis, which is very inexpensive, of the polycarbonate is performed to identify evidence of heavy elements, for instance, that generally comprise the tracing substance(s).

The principles of mass spectral measurements are simple and easily understood. A mass spectrometer bombards a substance under investigation with an electron beam and quantitatively records the result as a spectrum of positive ion fragments. This record is a mass spectrum. These rapidly moving ions, which are usually positive, and resolved on the basis of their mass-to-charge ratio.

The utility of mass spectrometry arises from the fact that the ionization process generally produces a family of positive particles whose mass distribution is characteristic of the parent species. Consequently, a mass spectrum of a particular substance provides information that is useful for determining chemical structures.

For instance, a unique molecular formula (or fragment formula) can often be derived from a sufficiently accurate mass measurement alone, such as high-resolution mass spectrometry. This is possible because the atomic masses are not integers. In this regard, a mass spectrum is a presentation of the masses of the positively charged fragments (including the molecular ion) versus their relative concentrations.

Figure 6:
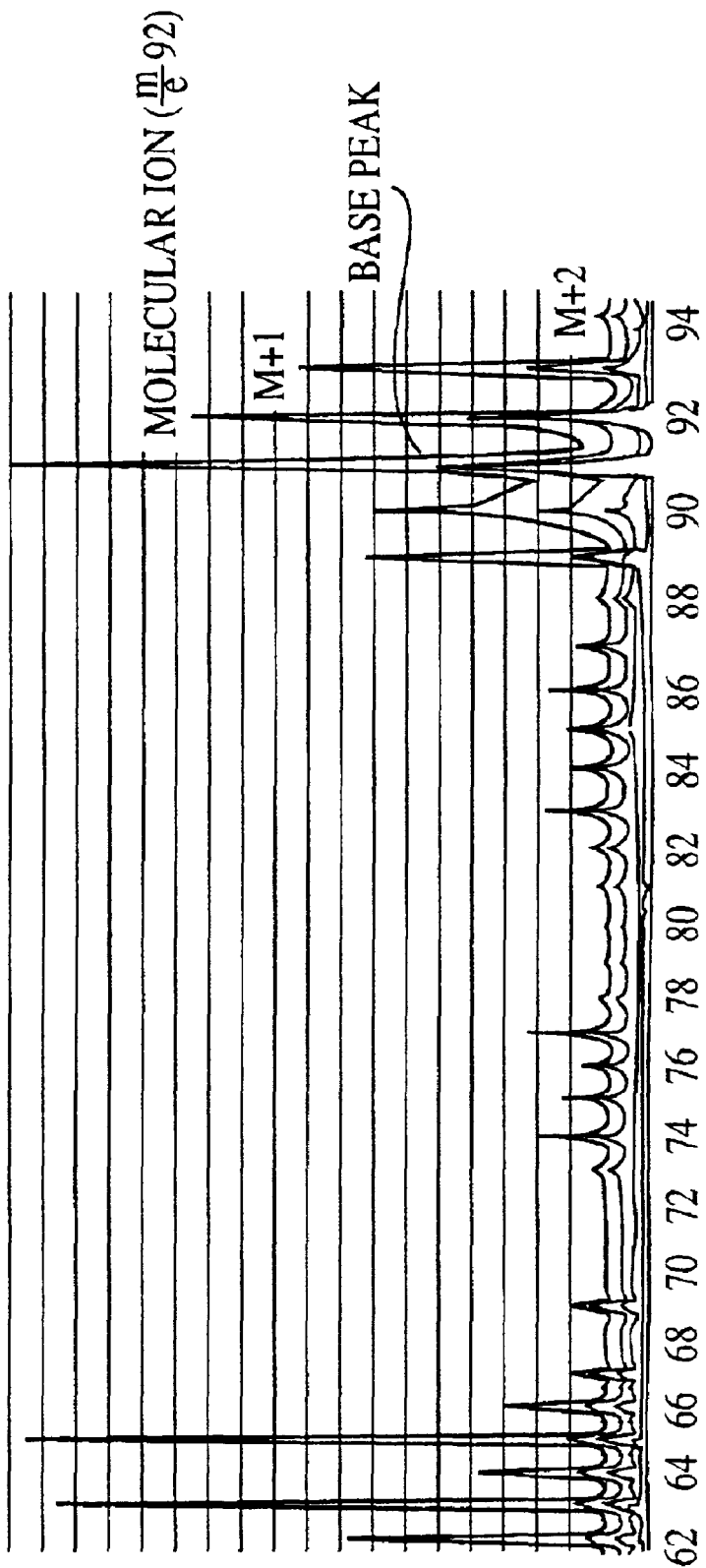
FIG. 6 illustrates three graphic presentations of a mass spectrum traced by a five-element galvanometer.

The most intense peak in the spectrum, called the base peak, is assigned a value of 100 percent, and the intensities (height times sensitivity factor) of the other peaks, including the molecular ion peak, are reported as percentages of the base peak. Prior Art FIG. 6 illustrates a graphic presentation of a mass spectrum traced by a five-element galvanometer.

Because the task of finding a molecular formula by trial-and-error from the output of a high-resolution mass spectrometer is a tedious one, tables, algorithms and computer programs have been assembled for this purpose. Unit mass resolution results and intensities of isotope peaks are used to arrive at molecular formulas. Consequently, computerized mass spectrometry of a particular substance is a conventional technique for determining chemical structures.

Optionally and preferably, the mass spectrometry is used not only to identify the existence or bare presence of the elements detected, but also to identify the ratio of isotopes in any given element. The accuracy of mass spectrometry is very high for relatively inexpensive costs. The accuracy would preferably not be a function of the concentration amounts of each tracing substance with respect to the polycarbonate, such as a dilution ratio, but rather the ratio between the isotopes of the tracing substance itself.

Alternatively, or in addition thereto, the ratio of isotopes in each tracing substance with respect to each other can be assayed to within 1 or 2 percent accuracy. Scientifically, this means that for any given substance, by varying those isotopes, an accurate identification of a batch can actually be made.

If three or four tracing substances are used, and each substance has three or four different isotopes, then the number of permutations and combinations would be very large, since each substance can be assayed to within one or two percent accuracy. Exemplary substances that can be used may include transparent oxides of some of the heavier elements, such as silicate, a lead dioxide and tin.

The polycarbonate marking technique described herein can be used on various materials, and is not restricted to data discs like CDs and DVDs. For example, the marking technique and process for implementing same, could be used in any material that uses polycarbonate. That is, it could be used in products made of polycarbonate or polystyrene, such as CD cases, films or MYLAR. In addition, the marking technique of the present invention may also be used in plexiglass, eyeglasses, sunglasses, helmets and the like.

Moreover, an alternative and more sensitive method of analyzing and/or performing spectrometry on substances is called neutron absorption, or neutron spectrometry. This method of spectrometry is becoming more prevalent in use and is very accurate; within 0.1 percent accuracy. This method is still applicable for analysis of heavy-type elements/substances embedded in polycarbonate during the manufacturing process described below.

Figure 7:
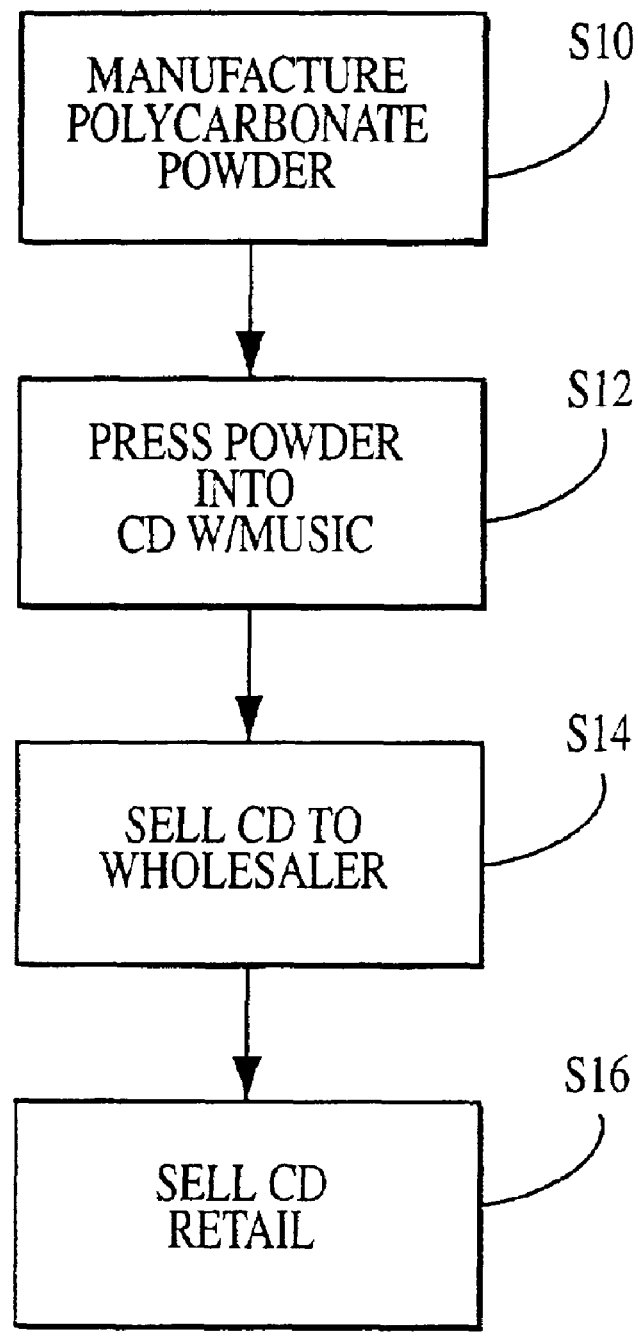
FIG. 7 illustrates a block diagram of the overall distribution path of a polycarbonate product, such as a CD or DVD, from manufacture to distribution to a customer.

Another important aspect of the present invention is its practical application as a quality control measure for products, such as CDs or DVDs. Reference is made to FIG. 7, which illustrates a block diagram of the overall distribution path of a polycarbonate product, such as a CD or DVD, from manufacture to distribution to a customer. For simplicity, the following steps are identified in the drawings by the letter "S" preceding the reference numeral; that is, Step 10 is shown in the drawing as "S10", etc.

At inception, each data disc is manufactured at a designated plant (Step 10), before transportation to a record or disc pressing plant, where the polycarbonate composition is pressed into the form of a CD or DVD, (Step 12). From the pressing plant, the CDs or DVDs are forwarded/sold to a distribution center or wholesaler (Step 14), which dispatches the CDs/DVDs to retail outlets (Step 16), before ultimate delivery to a customer.

As a mechanism for providing quality control, for example, each disc manufacturer may be given a certain type or well-known type of a tracing substance, such that the plant which assays the polycarbonate and tracing substance is considered the only authorized plant for the discs the plant produces. Other manufacturers of the polycarbonate or pressers would not be considered authorized.

Alternatively, an optional intermediate step of disc analysis on outgoing deliveries from a distribution center may be needed if a distribution center is positioned between the polycarbonate manufacturer and the pressing plant.

Figure 8:
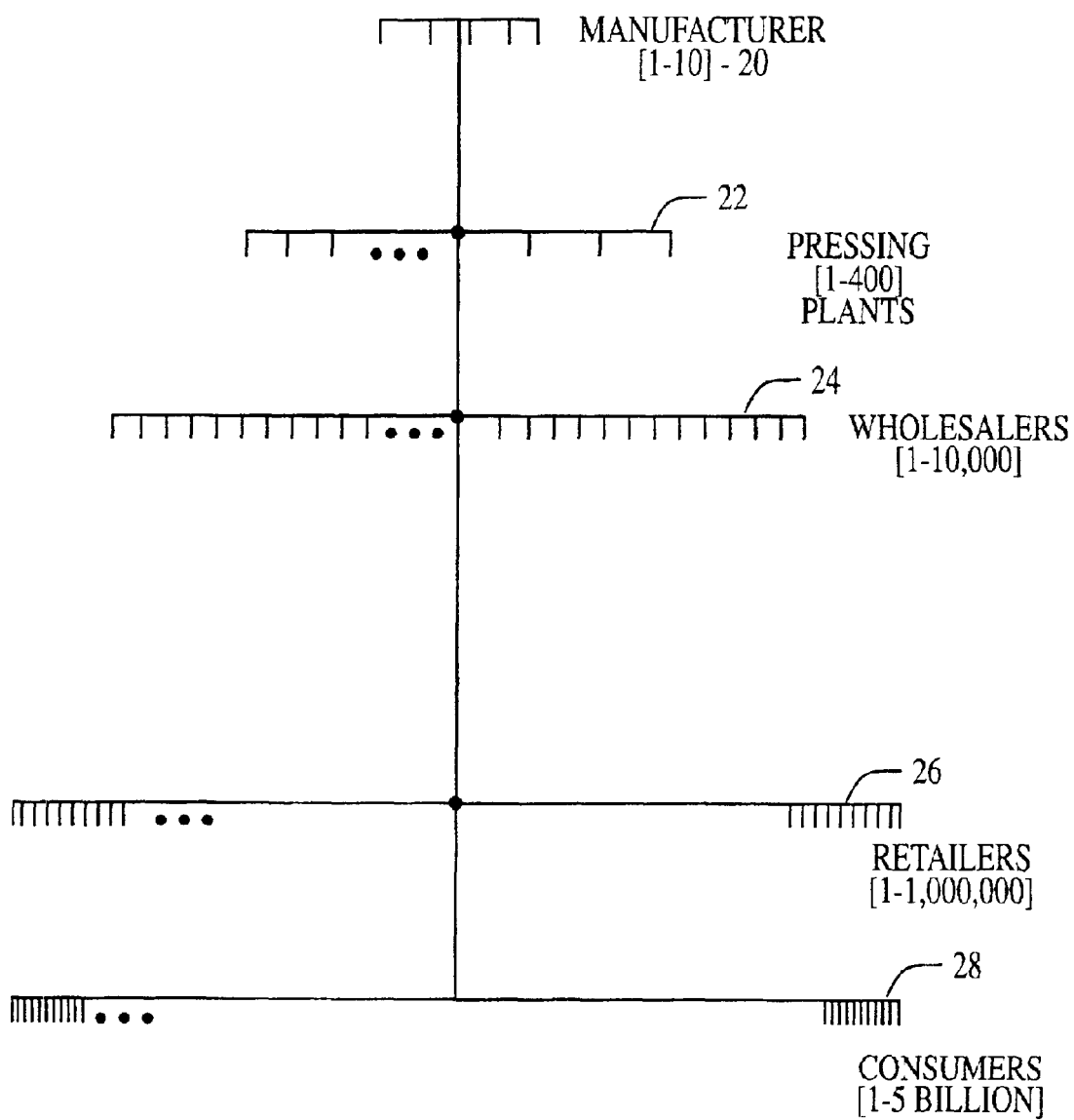
FIG. 8 illustrates the hierarchical relationship and the number of entities involved in the overall distribution of a polycarbonate product from manufacture to distribution to a customer.

FIG. 8 illustrates the hierarchical relationship and the number of entities involved in the overall distribution of polycarbonate products, like CDs, from manufacture to distribution to a customer. At 20 is shown the approximate number of polycarbonate manufacturers in the world, which totals less than 10. At 22, is shown the approximate number of disc pressing plants, which totals in the vicinity of 400. The number of polycarbonate manufacturers is obviously relatively small compared with the number of pressing plants, or the number of wholesalers (e.g., 400–10,000) as at 24, and the like.

At the bottom end of the hierarchy, as at 26, is shown the number of disc retailers, which approximates 1 million, and the number of disc consumers, as at 28, which ranges from 1 to 5 billion. Accordingly, the present invention targets the more realistic components in the data disc distribution chain; namely, the polycarbonate manufacturers and optionally the disc pressing plants.

The impact of the present invention, with respect to piracy and quality control issues, can also be appreciated from current statistics shown in FIGS. 9 through 11, which depicts the alarming levels of the music piracy problem. FIG. 9 shows eight (8) countries where music piracy is of particular concern, along with data on the estimated capacity for manufacturing all data discs, and data on legitimate demand for all data discs. So, for instance, in Taiwan where total legitimate demand for CD ROMs, audio and video CDs are 32 million units, the total manufacturing capacity for all CDs is more than 10 fold, at 350 million units.

In FIG. 10, a listing of 10 countries and data on reported instances of piracy in 1996 is shown. According to the table, Russia leads Brazil, China, Italy, India and Mexico, in having the highest dollar value of lost revenues due to piracy, at $350 million US dollars. Other countries on IFPI's top priority list for preventing music piracy are Argentina, Saudi Arabia, Greece and Malaysia.

FIG. 11 shows different levels of domestic piracy (in units) for Europe, the Middle East/Turkey, Asia, Africa, Australasia, Latin America and North America.

Figure 12:
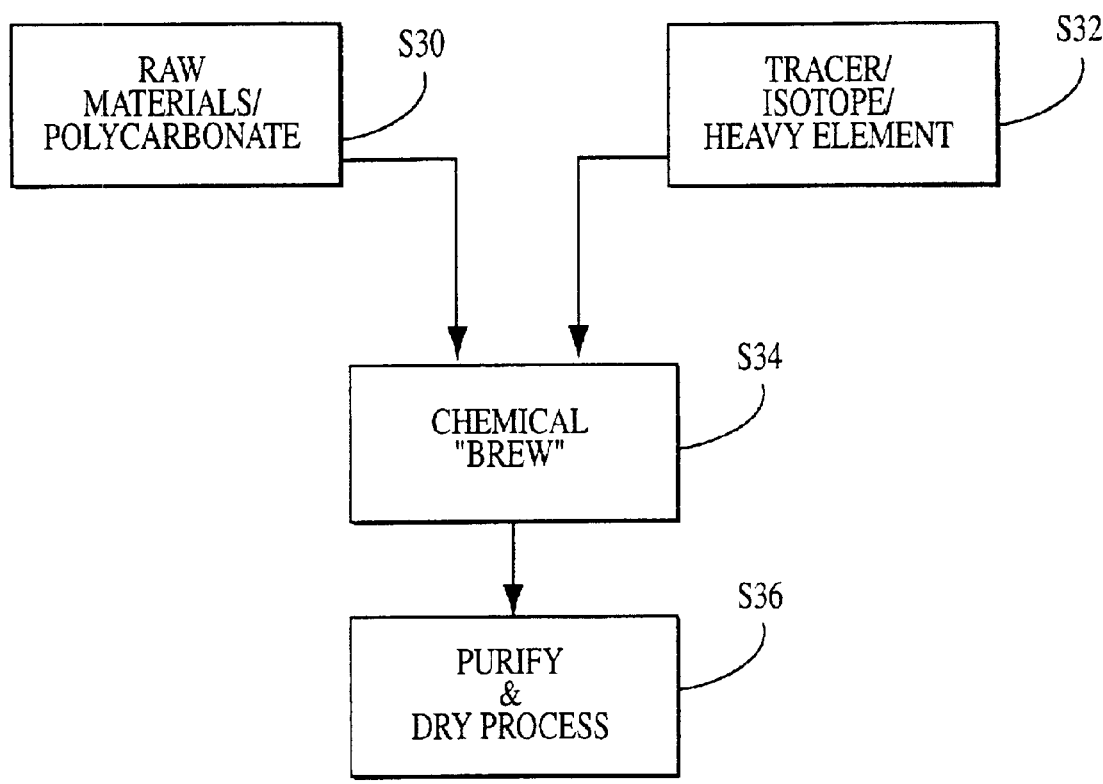
FIGS. 12–13 illustrate a process of embedding a tracing substance in the polycarbonate composition at the manufacturing stage.

In this regard, the present invention provides a method/system for tracking instances of music piracy. Referring to FIG. 12, a process of embedding a tracing substance in the polycarbonate composition at the manufacturing stage is illustrated. At Step 30, the raw materials comprising the polycarbonate composition is provided. The tracing substance (Step 32) is also provided and is preferably at the isotope level, where various different quantities of isotopes are used. FIG. 12 shows the tracing substance as being a heavy element isotope. The specific types and/or quantities of isotopes with respect to each other, are used to indicate a security marking, as described above.

Alternatively, the isotope ratio could be analyzed with respect to the total polycarbonate composition, or optionally to a specific order of composition. The security marking can indicate a specific lot, manufacturer and the like. Advantageously, the isotope numbers are detectable using spectrometry techniques.

Referring to FIG. 12, once the tracing substance, comprising one or more markers, is combined with the raw materials comprising a polycarbonate composition, the mixture is brewed chemically (Step 34), purified and dried (Step 36). Once dried, the mixture becomes a polycarbonate powder, which contains a tracing substance (Step 38).

Figure 13:
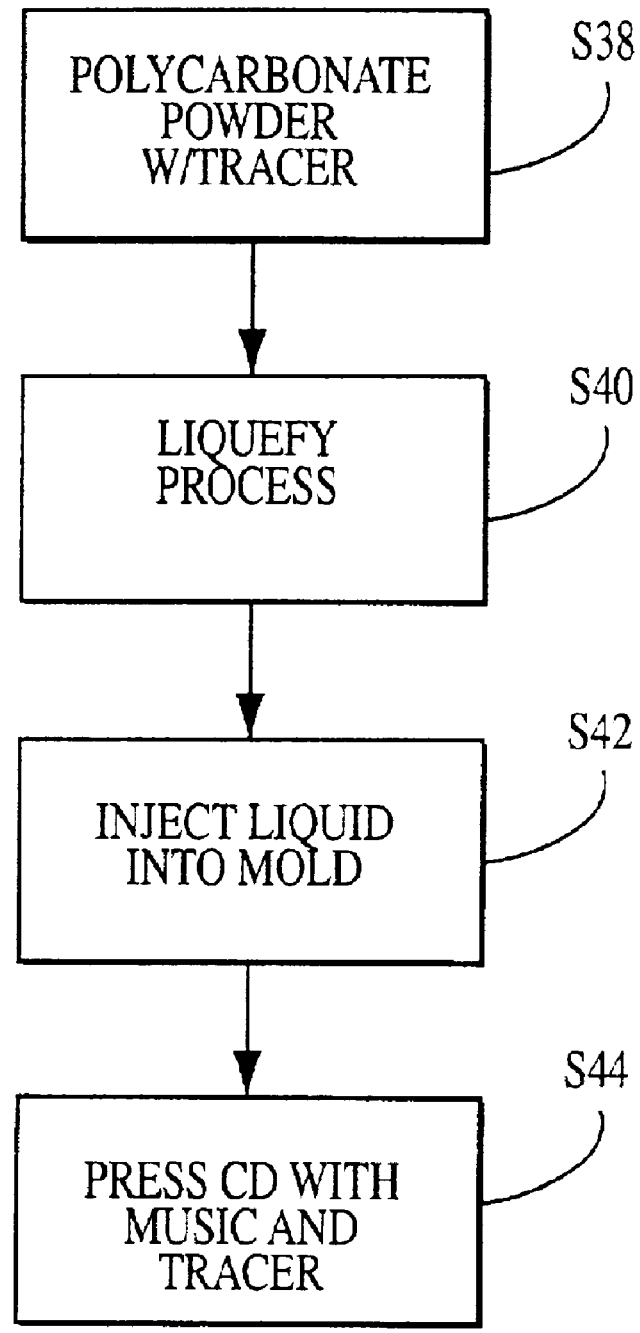

In FIG. 13, this powder is liquified (Step 40), where the liquid is injected into a mold (Step 42). Each CD or DVD is then pressed with the polycarbonate-tracing substance composition (Step 44).

Advantageously, all this is generally stored, for example, on a central or distributed database system, including spectrometry results performed on each disc or fraction of a disc that is suspected as being pirated. Accordingly, when mass or neutron spectrometry results are obtained, this information is fed to the database to find out additional information associated with the object disc. Alternatively, a search for lot or batch information could be done manually on the spectrometry results, albeit less efficiently.

For example, there are approximately 300 CD plants in the world. Additional facts that would be associated with a particularly marked CD may include where the polycarbonate powder was manufactured, where the polycarbonate batch was shipped for subsequent pressing, the identity of the plant, the date of manufacture or shipping, and the like. The lot date collected may be, for example, the date at which the polycarbonate power was manufactured and/or the date it was shipped to the pressing plant or an optional intermediary distributor. Similarly, the manufacturer could be making various lots of polycarbonate compositions, and the information collected may optionally be classified with a specific lot.

That is, in the present invention, the lot identity, manufacture date, ship date, manufacturer identity, who it was shipped to, and the like, is collected to assist in determining piracy related issues. In addition, if there were intermediate steps, then data on these intermediate steps may optionally be collected as well.

Data may also be embedded into the polycarbonate powder and/or associated therewith in a database, and collected with respect to designating certain lots for recording purposes, for example, such as for a specific music originator. Alternatively, the polycarbonate powder may be marked with information pertaining to where the lot/batch is going, and optionally with information directed to the specific music, title, group of titles, or other data to be pressed thereon by the pressing company.

The above information does not necessarily indicate whether a specific data disc was, in fact, pirated. Rather the above information indicates a source of origin of piracy for tracking purposes, and to determine whether any patterns of piracy may be established. In this manner, the marking technique of the present invention, using a tracing substance or other suitable material, provides a trail to a manufacturer and possibly a pressing plant, once a pirated CD is found, or once a CD/DVD is suspected of being pirated. Thus, the present invention advantageously provides evidence that a CD or DVD was dispatched to a particular pressing plant and manufacturer.

Additional information that may be collected may include information disclosed in U.S. Pat. No. 5,625,817 for the semiconductor manufacturing for the present invention, which generally relates to quality control issues, and which disclosure is incorporated herein by reference.

Various elements or substances may be used as a security marking, such as transparent oxides of some of the heavier elements like a silicate, lead dioxide, tin, cadmium (e.g., cadmium 12) and iridium (iridium 5). Each of these elements advantageously have many isotopes.

Another alternative is a silicate composition that has similar properties as glass; it is transparent, stable under high temperatures (e.g., 260 degrees Celsius) and the like. Similarly, a lead dioxide has, for example, 14 stable isotopes, small quantities of which will not substantially affect the appearance of a data disc.

Thus, in the present invention, any isotope or number of isotopes having similar properties of the above may be used. In addition, any concentration amounts and/or relative concentration amounts (to the data disc and/or to each other) of the isotopes or number of isotopes, may be used that effectuate the goals of the present invention. For example, there may be 10 suitable heavy elements, each of which has 4 to 8 stable isotopes, and each of the isotopes being able to be used at different concentration levels.

Figure 14:
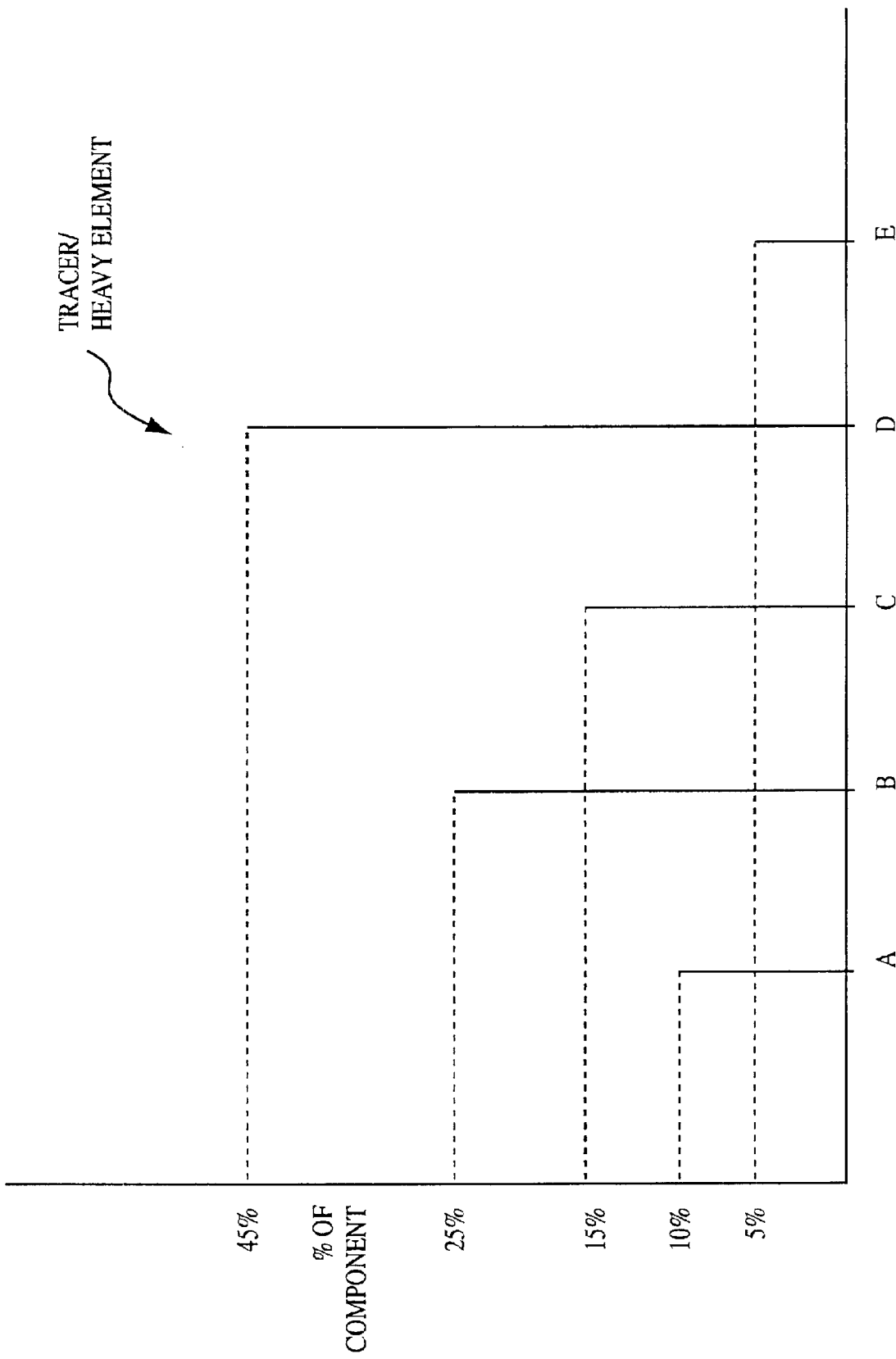
FIGS. 14 through 19 are six illustrations of different composition combinations that may be used in the present invention as a security marking.

FIGS. 14 through 18 are illustrations of different composition combinations that may be used in the present invention as a security marking. FIG. 14 is an illustration of a first example of a tracing substance combination with different percentages of five elements A, B, C, D an E illustrated with respect to each other.

Figure 15:
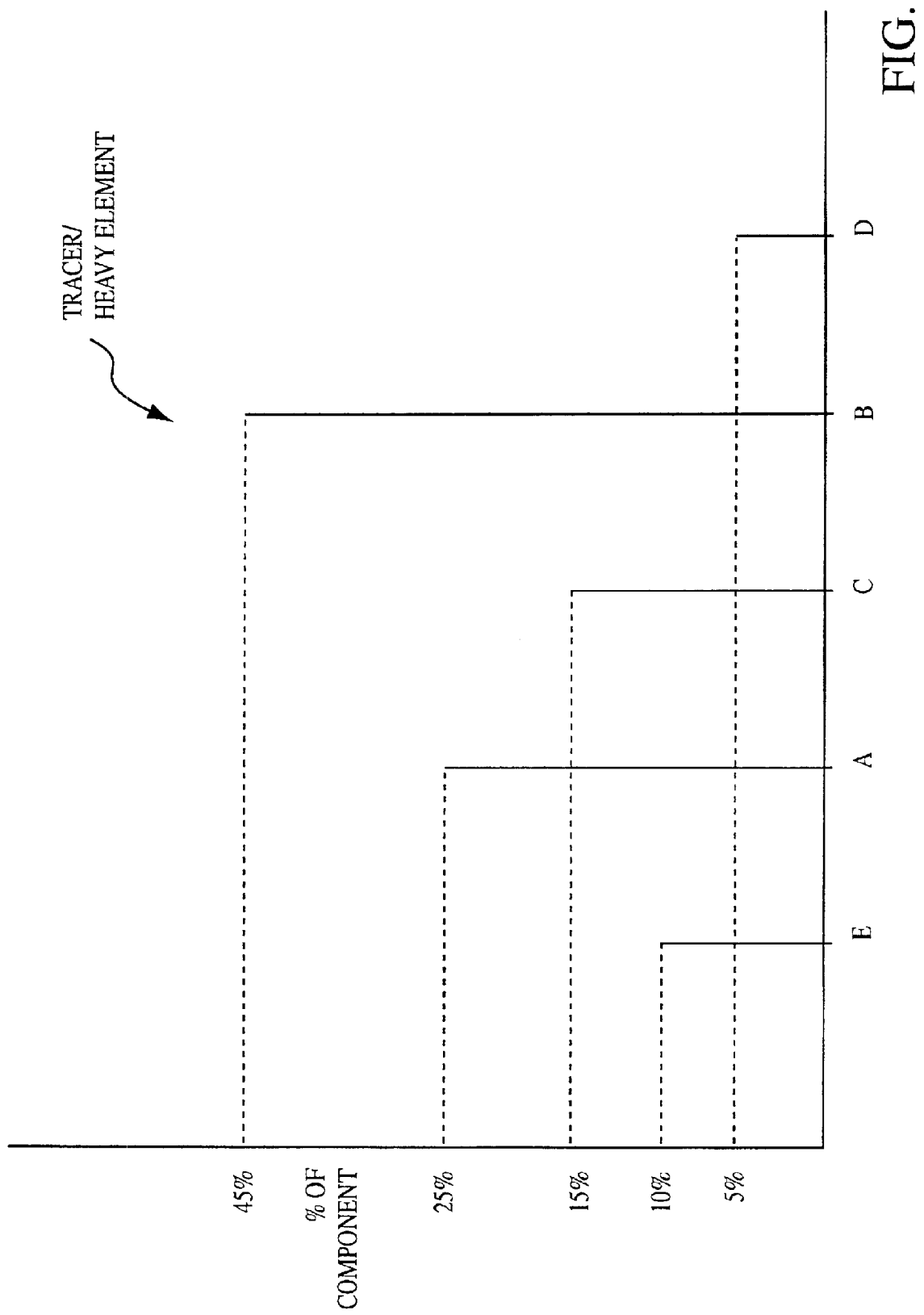

FIG. 15 is an illustration of a second example of a tracing substance combination with the same elements A–E of FIG. 14, but with a different order of elements and different concentration percentages.

Figure 16:
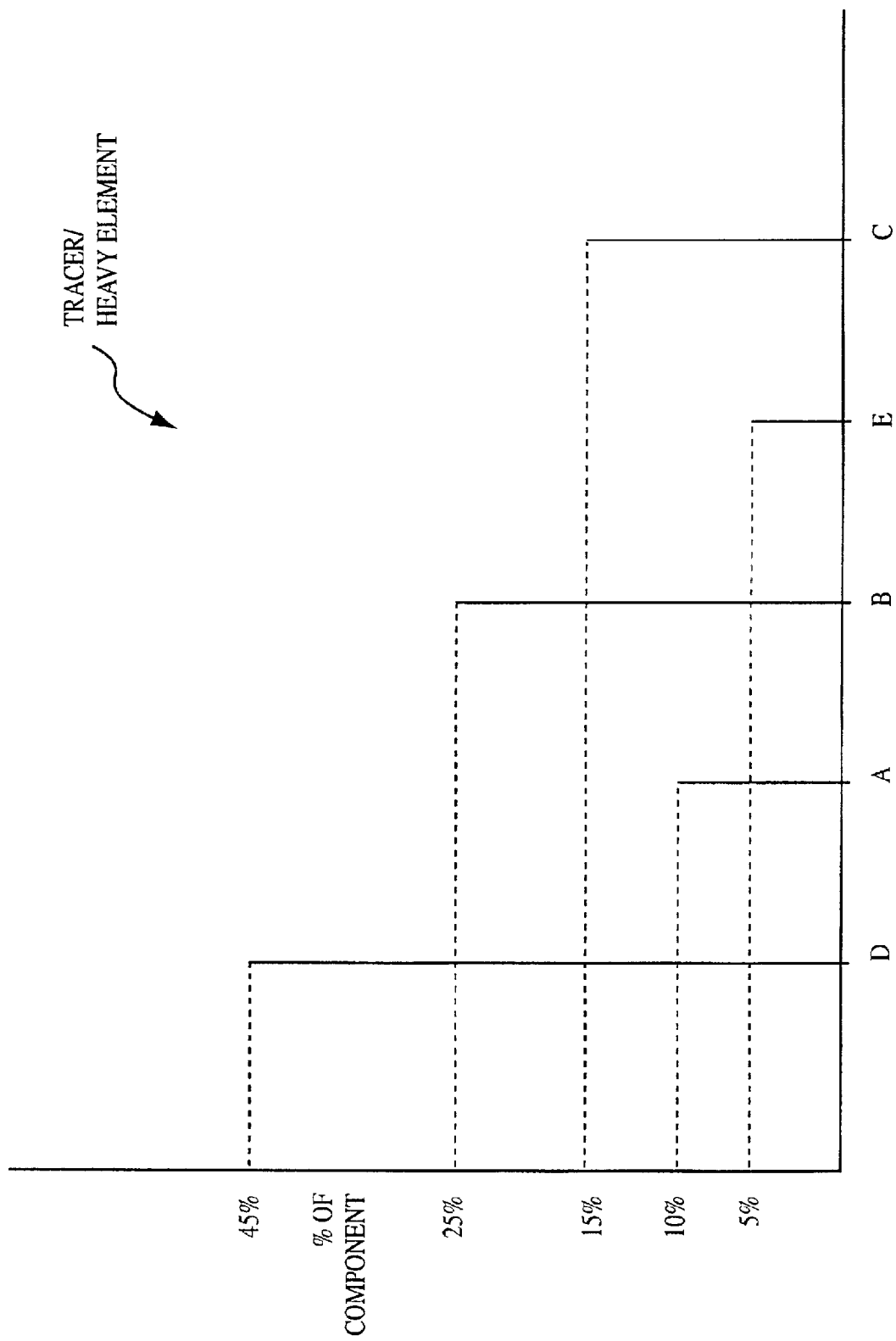

FIG. 16 is an illustration of a third example of a tracing substance combination with the same elements A–E of FIG. 14, but with yet another different order of elements and different concentration percentages. Here, element D has the highest composition concentration.

Figure 17:
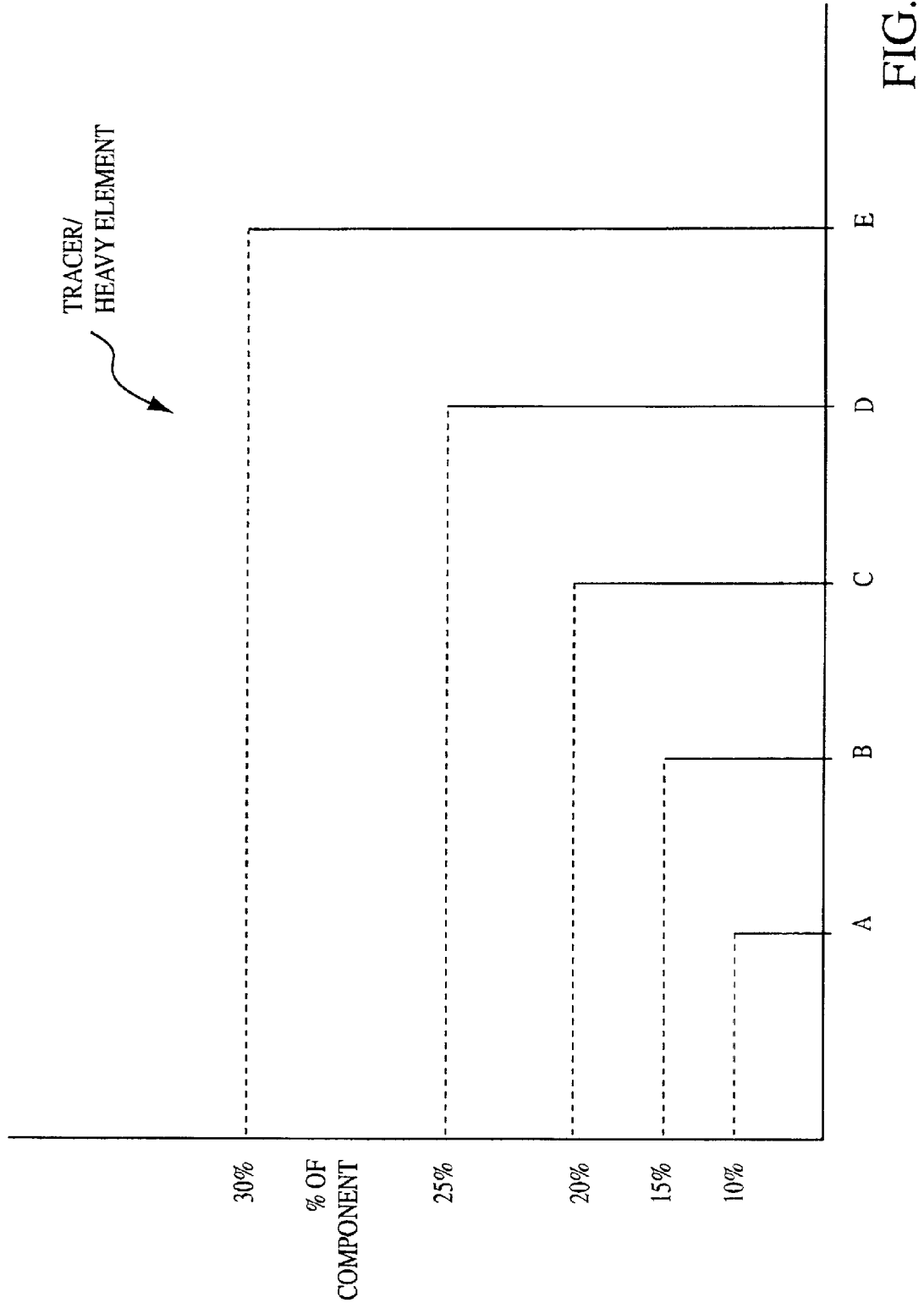

FIG. 17 is an illustration of a fourth example of a tracing substance combination with the same elements A–E of FIG. 14 and with the same order, but with different concentration percentages.

Figure 18:
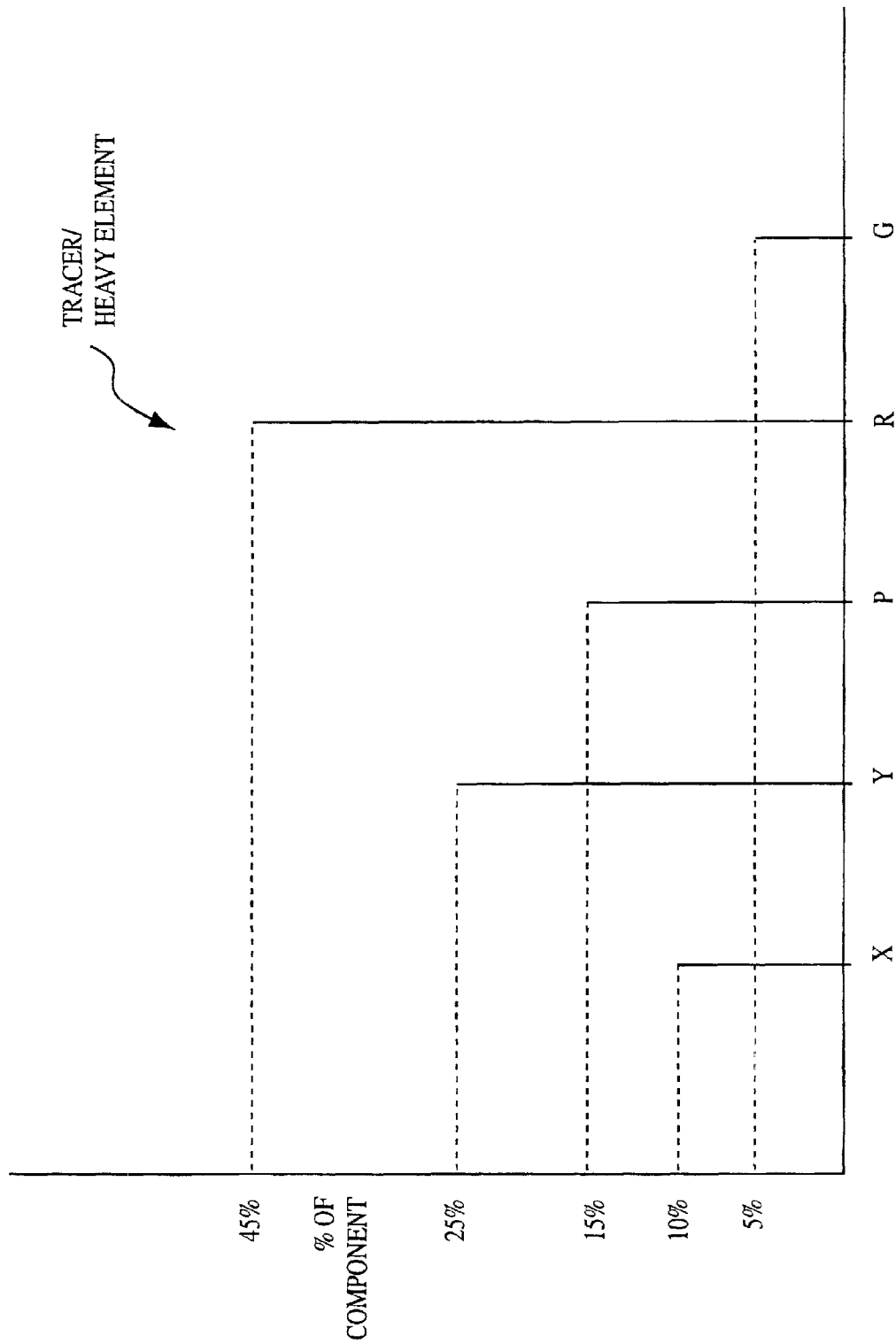

FIG. 18 is an illustration of a fifth example of a tracing substance combination with the same number of elements (e.g., 5), but with different elements X, Y, P, R, and G, and differing concentration percentages.

Figure 19:
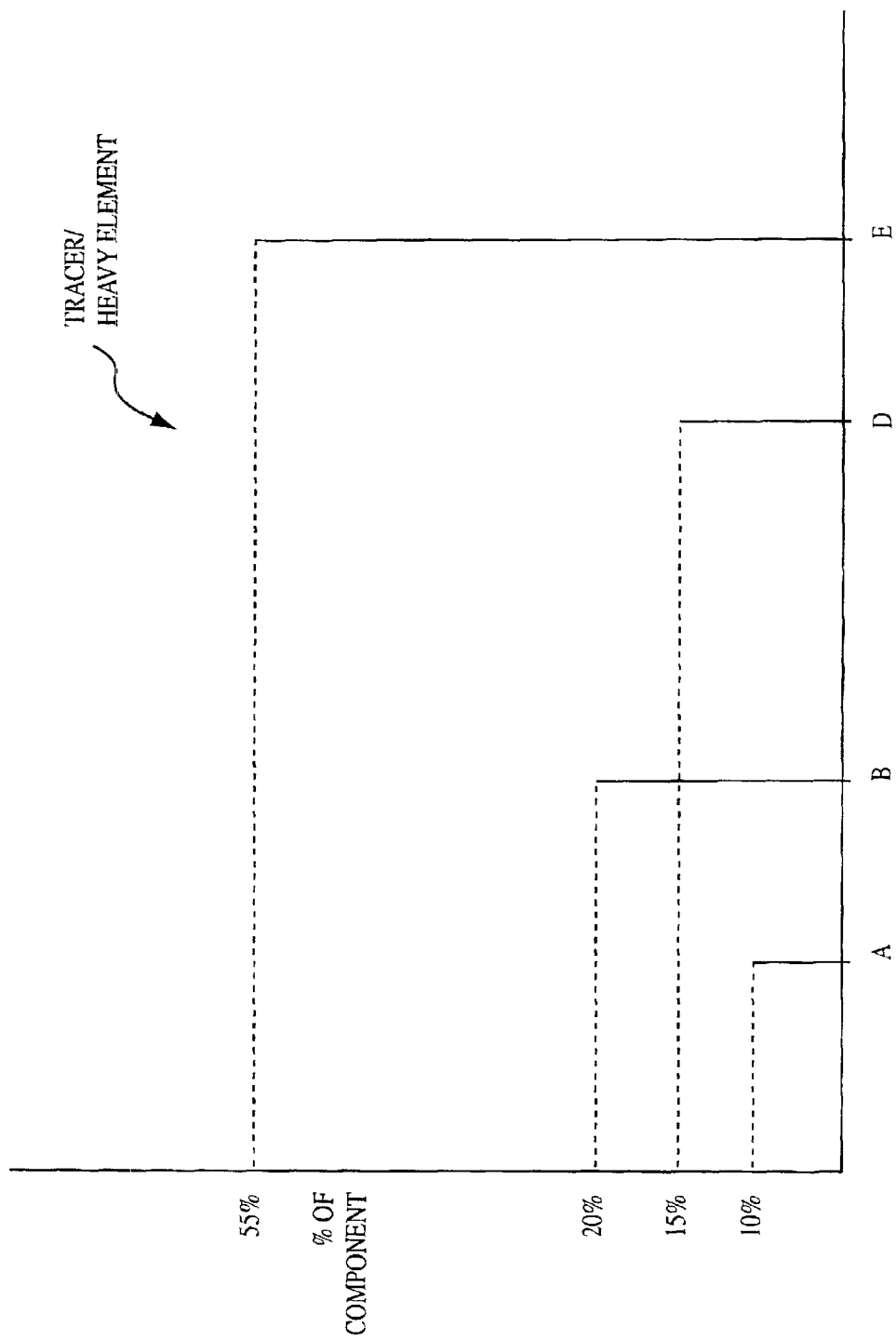

FIG. 19 is an illustration of a sixth example of a tracing substance combination with different elements A, B, D and E only, and with different concentration percentages. Here, four elements comprise the composition, rather than five.

The above examples are exemplary structural composition combinations that can be used to comprise the tracing substance constituting a security marking. Moreover, the combinative use of the above different compositions may comprise the combination of one or more tracing substances where each tracing composition may constitute a separate and/or different security marking as desired, to indicate specific lot, polycarbonate or raw material manufacturer, date of manufacture, and the like.

Alternatively, or in addition, the above different compositions constituting a plurality of security markings, may be encoded, thereby requiring uncoding, or may be used as an authentication key in an encryption algorithm to derive the specific data associated with the tracking of the data disc and/or to determine whether the data disc is in fact authentic.

The present invention applies to CDs, DVDs and all classes of optical disc carriers. In addition, the present invention applies to the type of marking used in the organic polymer overcoating. Accordingly, the present invention is not just a tracing substance only security marking that is mixed with the polycarbonate during manufacture of the polycarbonate powder. Rather, it is possible to use the present invention as a marking technique for a polymer overcoating product as well. The results for this alternative would be the same so that specified batch numbers and lots with the desired polymer overcoat can be traced.

As indicated above, any substance or material may be used as the marking substance, as long as the substance provides stable, reliable and repeatable performance over a substantial period of time. The selection of the marking substance or material is preferably a very stable material, and it is very important that the marking material is non-chemically reactive with the metalized glare.

For instance, free oxygen and chlorine and similar substances were early problems with compact discs resulting in laser rot. Laser rot describes a condition in which a data disc coatings deteriorates by impurities gradually over time such that the discs would stop playing. On the other hand, oxides are exemplary of substances that are very stable with heavier elements. Thus, the addition of the marking material is generally chemically stable and not cause deterioration of, for example, the standard metal reflective glare on the data disc, if present.

Figure 20:
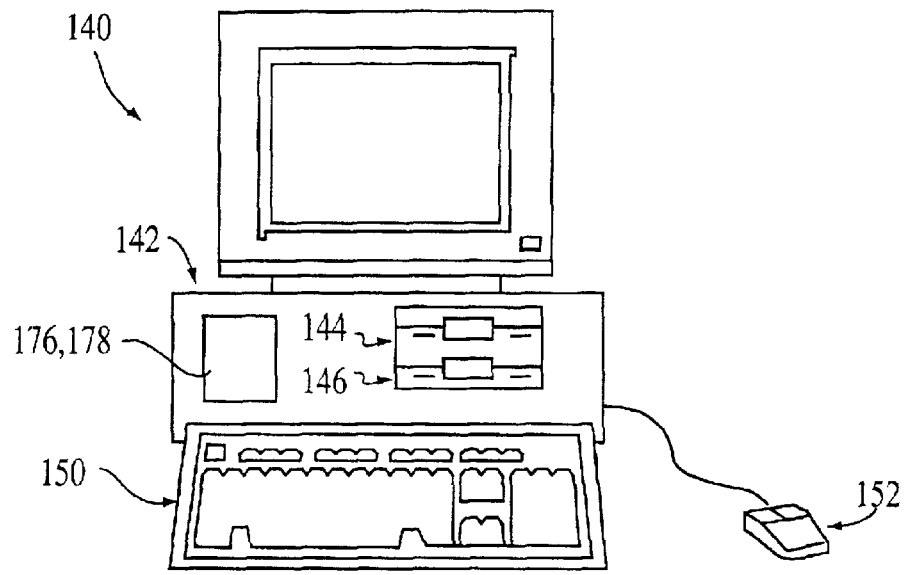
FIG. 20 is an illustration of a main central processing unit for implementing the computer processing in accordance with a computer implemented embodiment of the present invention.

FIG. 20 is an illustration of a main central processing unit for implementing the computer processing in accordance with a computer implemented embodiment of the present invention. The procedures described above may be presented in terms of program procedures executed on, for example, a computer or network of computers.

Viewed externally in FIG. 20, a computer system designated by reference numeral 140 has a central processing unit 142 having disc drives 144 and 146. Disc drive indications 144, 146 are merely symbolic of a number of disc drives that might be accommodated by the computer system. Typically these would include a floppy disc drive such as 144, a hard disc drive (not shown externally) and a CD ROM indicated by slot 146. The number and type of drives varies, typically with different computer configurations. Disc drives 144, 146 are in fact optional, and for space considerations, may be easily omitted from the computer system used in conjunction with the production process/apparatus described herein.

The computer also has an optional display 148 upon which information is displayed. In some situations, a keyboard 150 and a mouse 152 may be provided as input devices to interface with the central processing unit 142. Then again, for enhanced portability, the keyboard 150 may be either a limited function keyboard or omitted in its entirety. In addition, mouse 152 may be a touch pad control device, or a track ball device, or even omitted in its entirety as well. In addition, the computer system also optionally includes at least one infrared transmitter 176 and/or infrared receiver 178 for either transmitting and/or receiving infrared signals, as described below.

Figure 21:
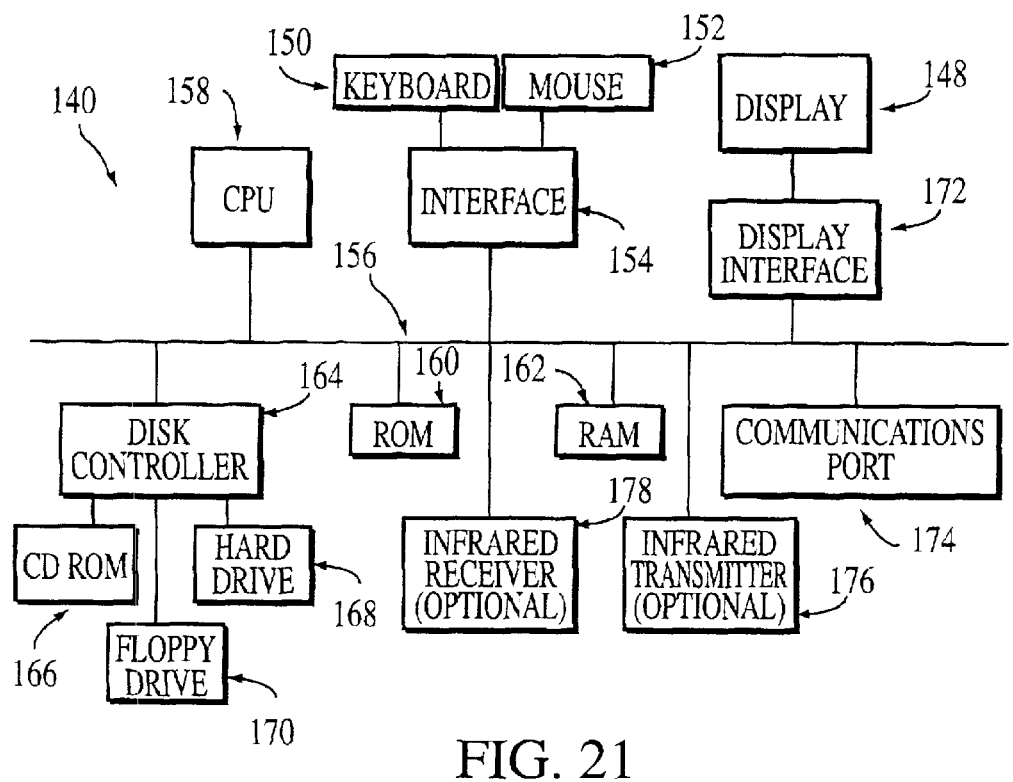
FIG. 21 illustrates a block diagram of the internal hardware of the computer of FIG. 20.

FIG. 21 illustrates a block diagram of the internal hardware of the computer of FIG. 20. A bus 156 serves as the main information highway inter-connecting the other components of the computer. CPU 158 is the central processing unit of the system, performing calculations and logic operations required to execute a program. Read only memory (ROM) 160 and random access memory (RAM) 162 constitute the main memory of the computer. Disc controller 164 interfaces one or more disc drives to the system bus 156. These disc drives may be floppy disc drives such as 170, or CD ROM or DVD (digital video disc) drives such as 166, or internal or external hard drives 168. As indicated previously, these various disc drives and disc controllers are optional devices.

A display interface 172 interfaces display 148 and permits information from the bus 156 to be displayed on the display 148. Again as indicated, display 148 is also an optional accessory. For example, display 148 could be substituted or omitted. Communication with external devices, for example, the components of the apparatus described herein, occurs using communications port 174. For example, optical fibers and/or electrical cables and/or conductors and/or optical communication (e.g., infrared and the like) and/or wireless communication (e.g., radio frequency (RF) and the like) can be used as the transport medium between the external devices and communication port 174.

In addition to the standard components of the computer the computer also optionally includes at least one of infrared transmitter 176 or infrared receiver 178. Infrared transmitter 176 is used when the computer system is used in conjunction with one or more of the processing components/stations that transmits/receives data via infrared signal transmission.

Figure 22:
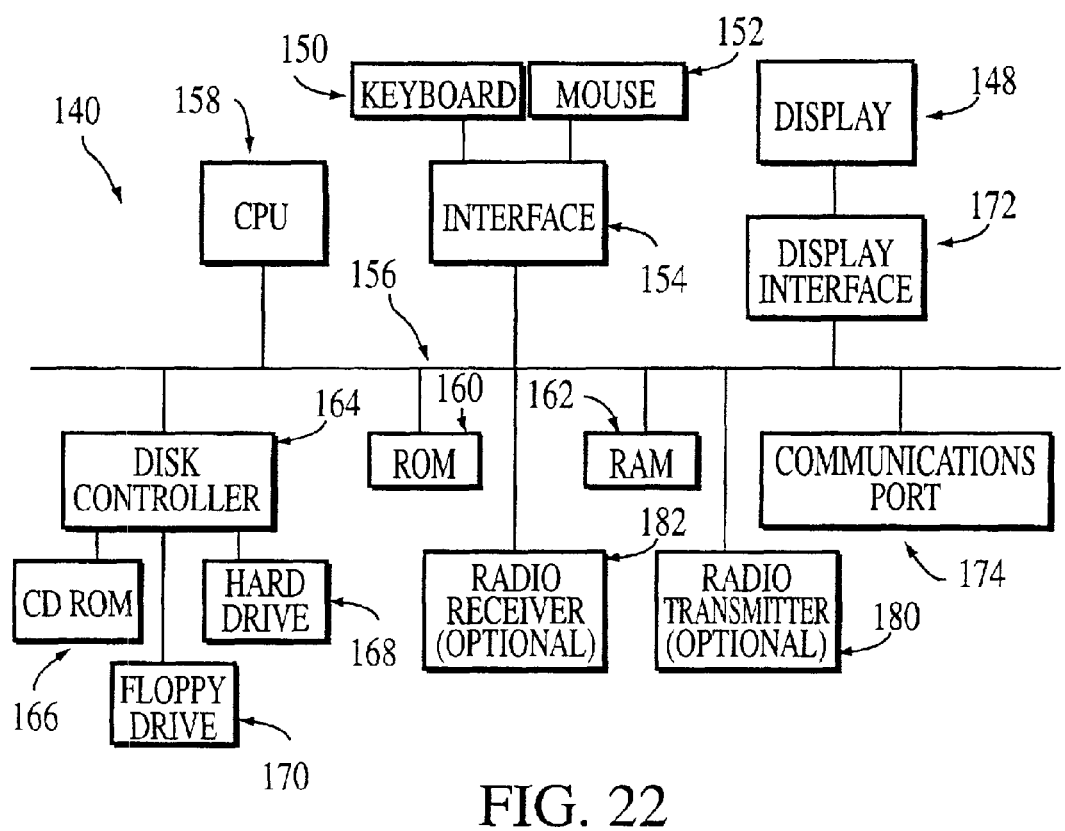
FIG. 22 is a block diagram of the internal hardware of the computer of FIG. 20 in accordance with a second embodiment.

FIG. 22 is a block diagram of the internal hardware of the computer of FIG. 20 in accordance with a second embodiment. In FIG. 22, instead of utilizing an infrared transmitter or infrared receiver, the computer system uses at least one of a low power radio transmitter 180 and/or a low power radio receiver 182. The low power radio transmitter 180 transmits the signal for reception by components of the production process, and receives signals from the components via the low power radio receiver 182. The lower power radio transmitter and/or receiver 180, 182 are standard devices in industry.

Figure 23:
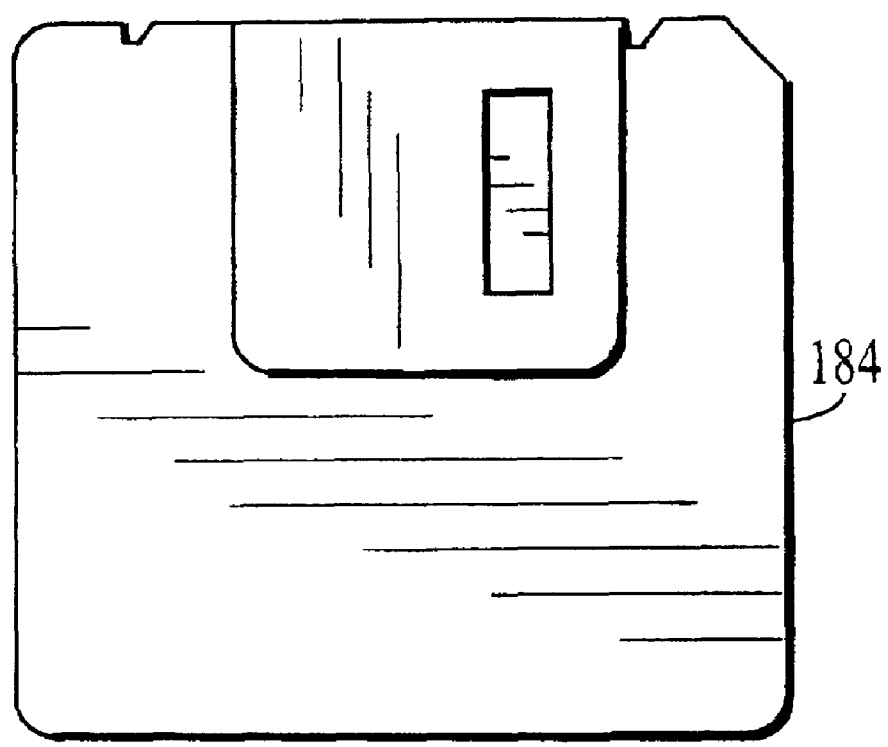
FIG. 23 is an illustration of an exemplary memory medium which can be used with disc drives illustrated in FIGS. 20–22.

FIG. 23 is an illustration of an exemplary memory medium which can be used with disc drives illustrated in FIGS. 20–22. Typically, memory media such as floppy discs, or a CD ROM, or a digital video disc will contain, for example, a multi-byte locale for a single byte language and the program information for controlling the computer to enable the computer to perform the functions described herein. Alternatively, ROM 160 and/or RAM 162 illustrated in FIGS. 20–21 can also be used to store the program information that is used to instruct the central processing unit 158 to perform the operations associated with the production process.

Although processing system 140 is illustrated having a single processor, a single hard disc drive and a single local memory, processing system 140 may suitably be equipped with any multitude or combination of processors or storage devices. Processing system 140 may, in point of fact, be replaced by, or combined with, any suitable processing system operative in accordance with the principles of the present invention, including sophisticated calculators (and hand-held), laptop/notebook, mini, mainframe and super computers, as well as processing system network combinations of the same.

Conventional processing system architecture is more fully discussed in *Computer Organization and Architecture*, by Williams Stallings, McMillan Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Each of the foregoing publications is incorporated herein by reference.

Alternatively, the hardware configuration may be arranged according to the multiple instruction multiple. data (MIMD) multiprocessor format for additional computing efficiency. The details of this form of computer architecture are disclosed in greater detail in, for example, U.S. Pat. No. 5,163,131; Boxer, A., "Where Buses Cannot Go", IEEE SPECTRUM, February 1995, pp. 41–45; and Barroso, L. A. et al., "RPM: A Rapid Prototyping Engine for Multiprocessor Systems", IEEE COMPUTER, February 1995, pp. 26–34, all of which are incorporated herein by reference.

In alternate preferred embodiments, the above-identified processor, and in particular microprocessing circuit 158, may be replaced by or combined with any other suitable processing circuits, including programmable logic devices, such as PALs (programmable array logic) and PLAs (programmable logic arrays), DSPs (digital signal processors), FPGAs (field programmable gate arrays), ASICs (application specific integrated circuits), VLSIs (very large scale integrated circuits) or the like.

Figure 24:
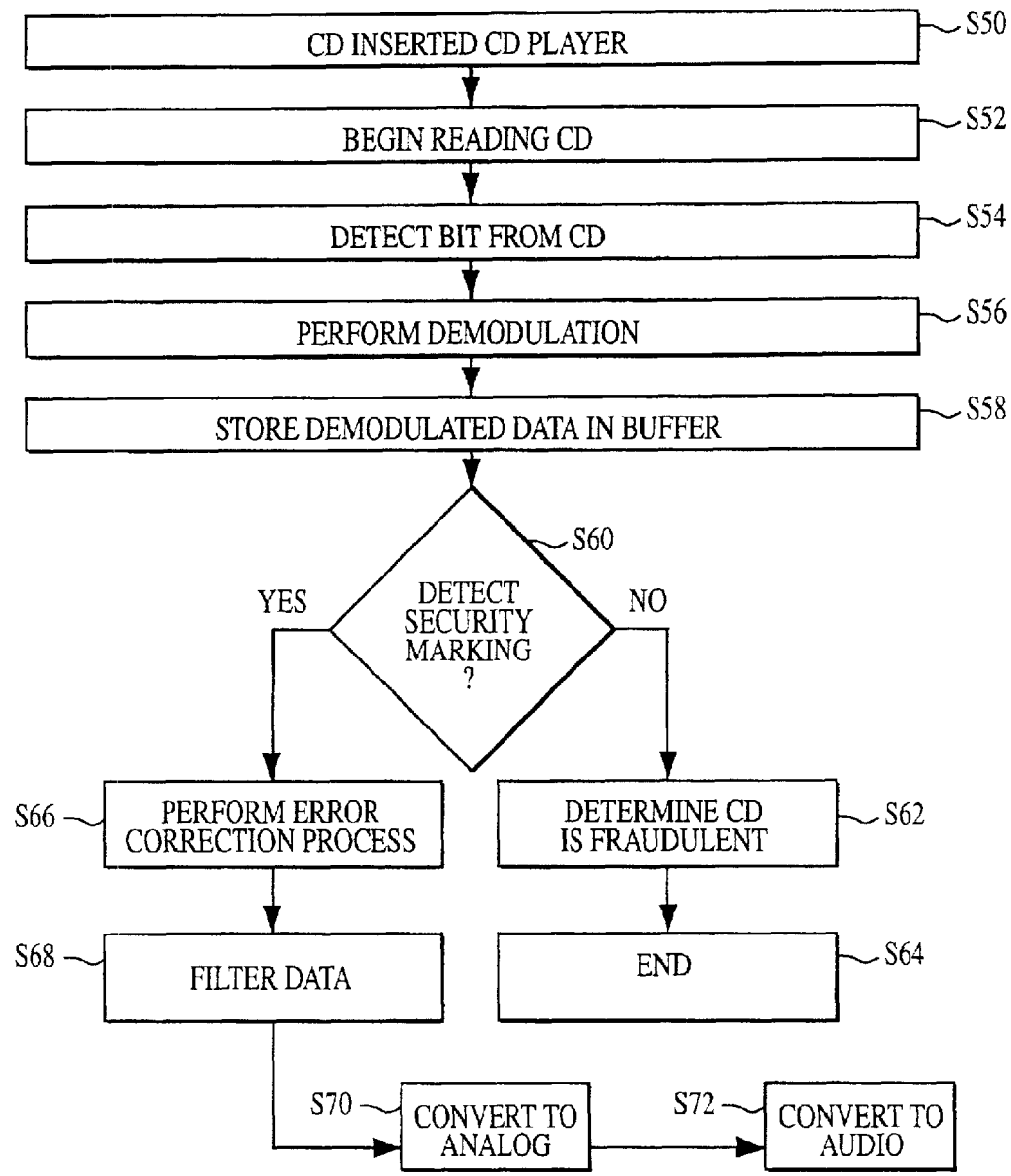
FIG. 24 shows a flow chart of the decision logic describing the authentication process of a CD, which contains the security marking of the present invention, to be played on a CD player.

It is important to recognize that the security marking method and system of the present invention, can be used for authentication purposes in order to prevent unauthorized access to the data on the disc. FIG. 24 is illustrative. It shows a flow chart of the decision logic describing the authentication process of a CD, containing a security marking, to be played on a CD player.

For simplicity, the following steps are identified in the drawings by the letter "S" preceding the reference numeral; that is, Step 50 is shown in the drawing as "S50", etc.

In FIG. 24, the process begins at Step 50 when a CD is inserted into a CD player. The player begins reading the CD, (Step 52), by detecting bits from the disc's surface (Step 54). Once the data is recovered, the data is modulated using, for example, eight-to-fourteen modulation (Step 56). The demodulated data is sent to a buffer (Step 58).

At Step 60, (S60), the player's circuitry or processes must determine whether the CD contains a predetermined tracing substance comprising the security marking. If no security marking exists, the disc is determined to be fraudulent (Step 62), and the disc player ends playback activity (Step 64). On the other hand, if it is found that the disc contains the predetermined security marking, the player's circuitry is triggered to begin the error removal process (Step 66) in which errors are removed, data is filtered (Step 68) and ultimately converted to sensible audible output data (Steps 70, 72). While the above description focuses on a particular sequence of process steps, the present invention may alternatively be used via a different sequence of the above described steps.

Figure 25:
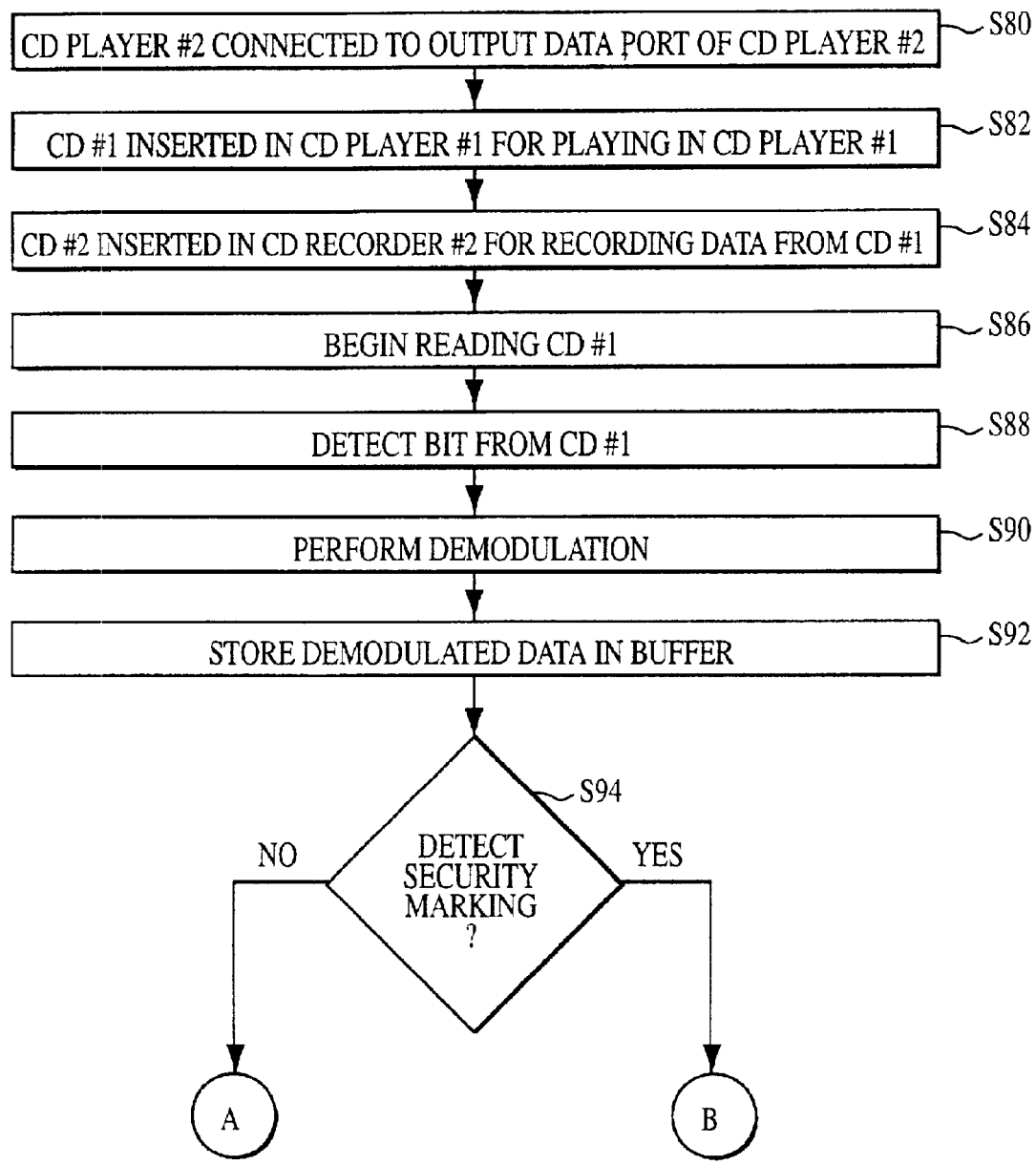
FIGS. 25–28 illustrate a flow chart of the decision logic describing operations when a first CD, which contains the security marking of the present invention, plays data to be recorded by a second CD, which does not contain the security marking of the present invention.
Figure 26:
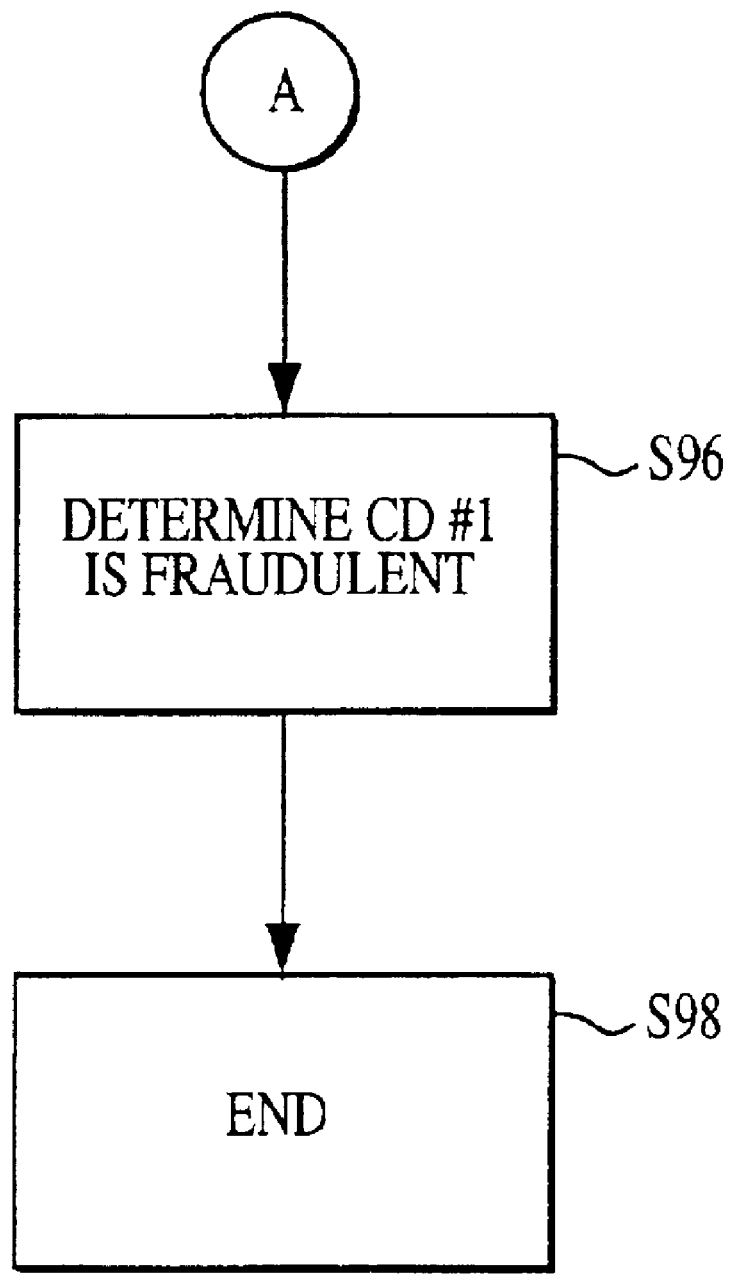

FIG. 25 illustrates a flow chart of the decision logic describing operations when a first CD, containing the security marking of the present invention, plays the data to be recorded by a second CD, which does not contain the security marking of the present invention. For simplicity, the CD player will be referenced as player #1, and the CD recorder will be referenced as recorder #2. Also, the first CD played by player #1 will be referenced as CD #1, and the second CD recorded by recorder #2 will be referenced as CD #2.

At inception, (Step 80 or S80), CD player #1 is connected to the output port of recorder #2, or other standard means for capturing the output of player #1. Playback begins when CD #1 is inserted into player #1 (Step 82). Recording begins when CD #2 is inserted into recorder #2 (Step 84). The next step in CD player #1 is the reading of CD #1, (Step 86), by detecting bits contained on the surface of CD #1 (Step 88).

Once the data is recovered, the data is demodulated using, for example, eight-to-fourteen modulation or other standard modulation (Step 90). The demodulated data is transferred and stored in a buffer, (Step 92).

At Step 94 (S94) depicted in FIG. 24, it is determined whether the disc contains the security marking. If no security marking is detected, the disc is determined to be fraudulent (Step 96), and the disc player ends playback activity (Step 98), as earlier stated. See FIG. 25.

Figure 27:
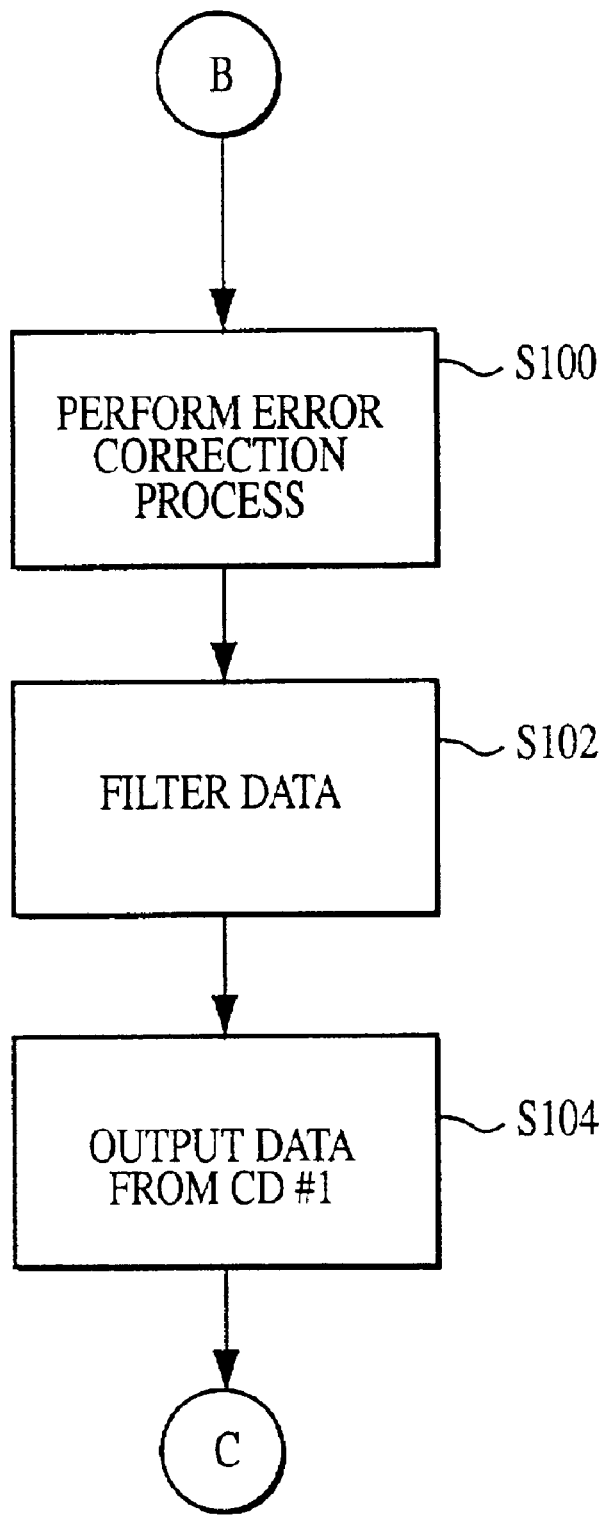

On the other hand, if it is found that the disc contains the security marking, the next Step 100, the player's circuitry is triggered to begin the error removal process in which errors are removed, data is filtered (Step 102) and ultimately converted to sensible audible output data (Steps 104). See FIG. 27.

Figure 28:
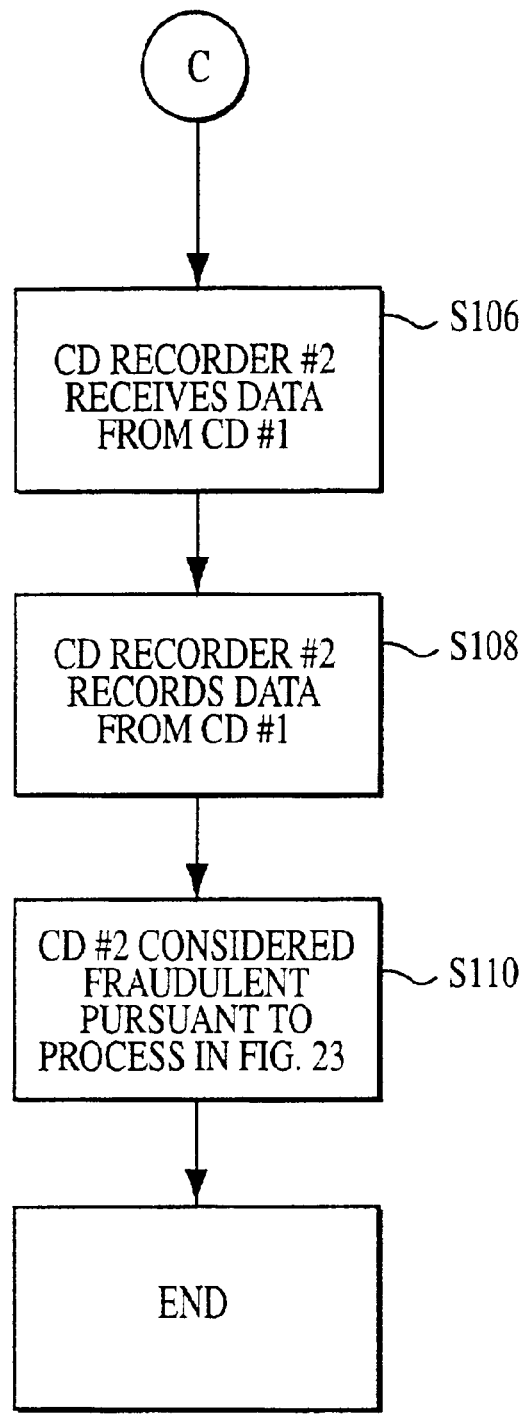

Referring to FIG. 28, at this juncture, the authentication process for playing the CD is completed, and recorder #2 receives the audio data from CD #1 (Step 106). Upon receipt, CD recorder #2 records the data onto CD #2, which is a copy (Step 108). If CD #2 is later inserted into a CD player, it will be determined to be a fraudulent CD pursuant to the above-mentioned process of FIG. 24, because CD #2 does not contain the requisite security marking, (Step 110).

Figure 29:
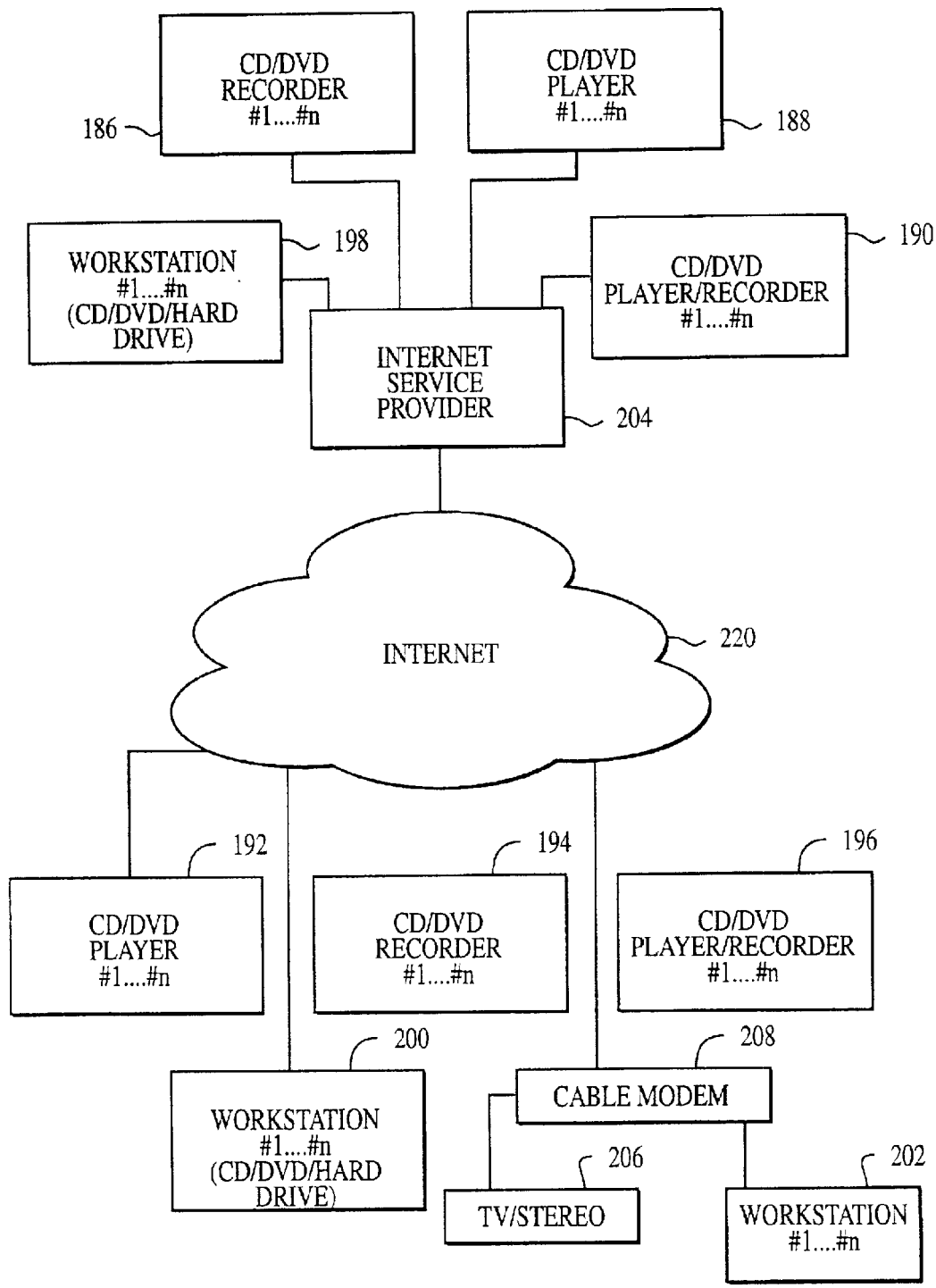
FIG. 29 shows a plurality of disc players, disc recorders and work stations connected to a global network, such as the Internet, via an Internet Service Provider, in accordance with one embodiment.

FIG. 29 shows a plurality of disc players and disc recorders 186, 188, 190, 192, 194, 196 and work stations 198, 200, 202 connected to a global network, such as the Internet 220, via an Internet Service Provider 204, in accordance with one embodiment. The above system also accommodates Internet access to electronic audio/video data files through home electronic equipment, such as television/stereos 206 and cable/modem 208. Thus, data may emanate from, or be transmitted to, any one of these stations or devices.

Figure 30:
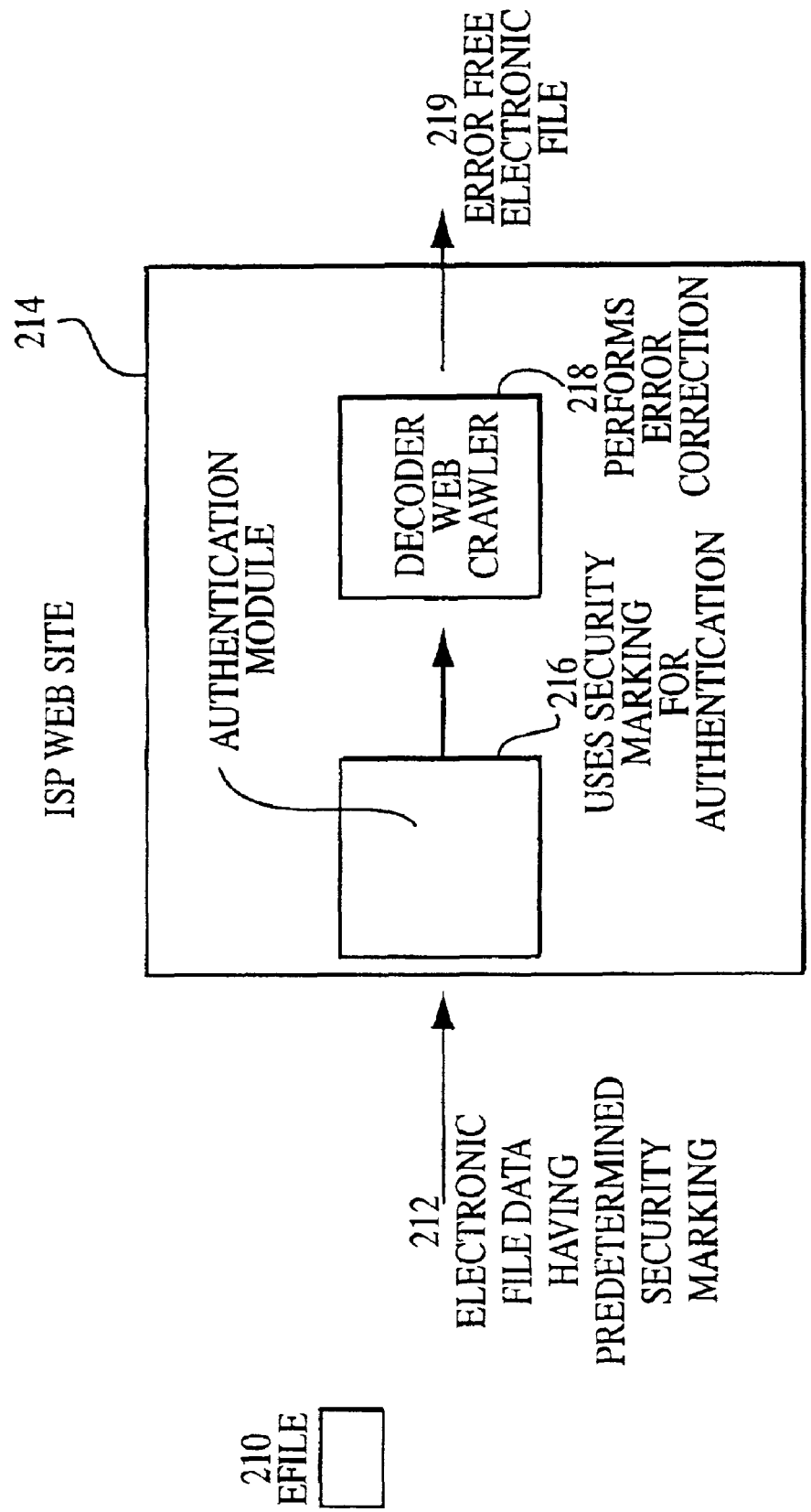
FIG. 30 shows a block diagram of the architecture through which one or more security markings of the present invention are stored in an electronic file, and are used for authenticating the existence of a non-pirated efile.
Figure 31:
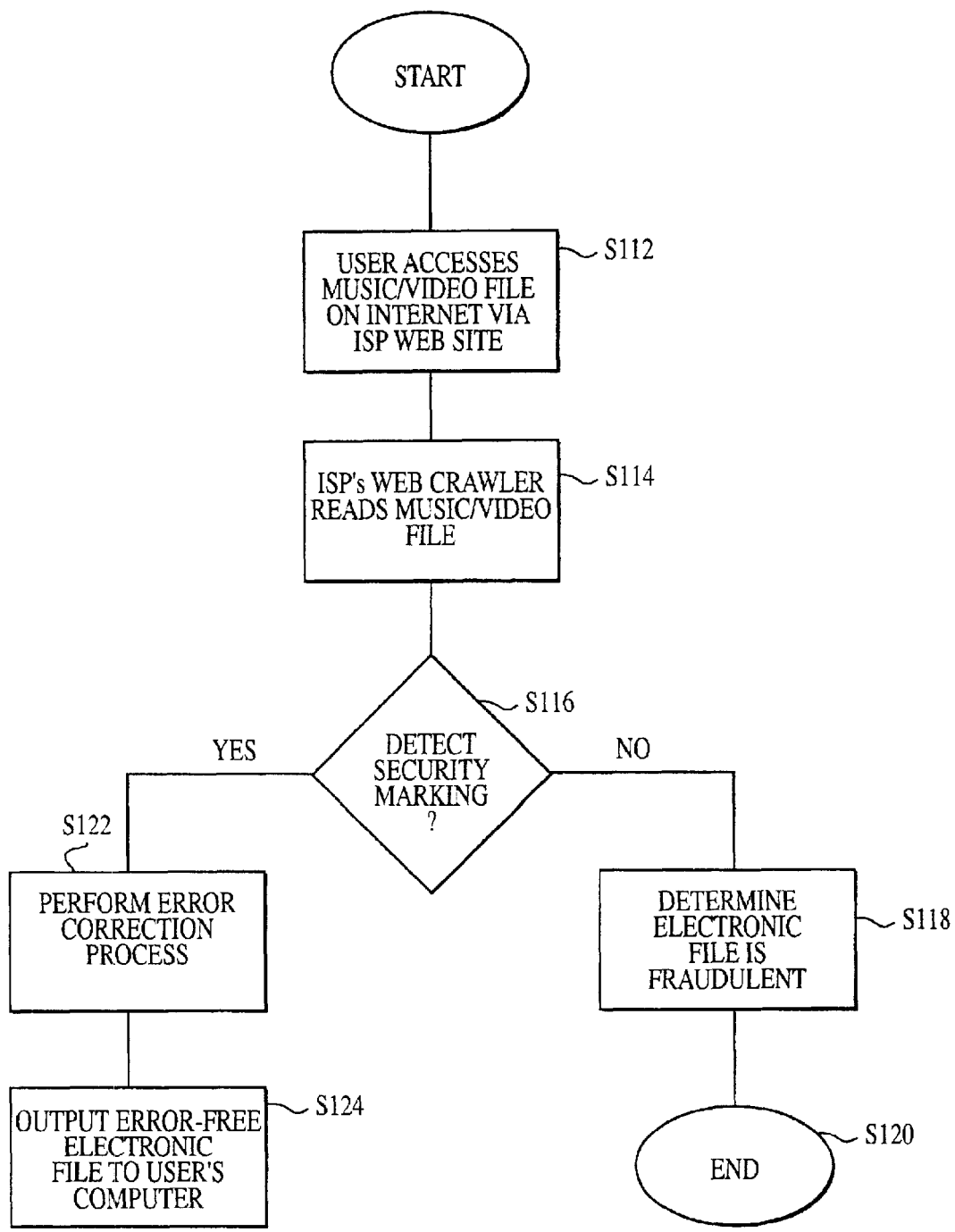
FIG. 31 illustrates a flow chart of the decision logic describing the authentication process of an electronic audio/video data file, containing the security marking of the present invention, retrieved via the Internet for playing.

FIGS. 30–31 shows the authentication process as it applies to Internet-related playing and copying. For instance, FIG. 30 shows a block diagram of the architecture through which one or more security markings are stored in an electronic file, and are used for authenticating the existence of a non-pirated efile. The architecture begins with a data media, which may be a CD, DVD, a computer or network of computers, such as the Internet, capable of storing data.

In this embodiment, the data is an electronic video or audio data file ("efile") 210 into which a predetermined tracing substance comprising a security marking is embedded therein.

The resulting data ("efile data") 212 containing security marking(s) is transmitted into an authentication module 216 when efile 210 is requested by a user over the Internet. Authentication module 216 is disposed, for example, at the ISP's web site 214, which uses the tracing substance in efile data 212 for authenticating whether efile 210 is a non-pirated file. Once efile 210 is authenticated, authentication module 216 transfers data 212 to a decoder web crawler 218, which intakes the data, manipulates it, performs error correction and outputs corrected data efile 219.

The above description is one example of the architecture used to implement the present invention. Other architectures may also be used. For example, the ISP website and/or server need not physically house or contain the authentication or decoder modules, but one or both of these devices may be disposed remote to the ISP website and/or server.

FIG. 31 illustrates a flow chart of the decision logic describing the authentication process of an electronic audio/video data file retrieved via the Internet for playing. The process begins at Step 112 (S112) when a user accesses music and/or video file(s) on the Internet via an ISP's web site 214. The ISP's decoder web crawler 218 begins reading the efile 210, (Step 114), looking for one or more security markings. (Step 116). If no security marking is detected, efile 210 is determined to be fraudulent, (Step 118), and efile 210 is not transmitted to the user; the process ends, (Step 120). Thus, unauthorized access is prevented.

On the other hand, if it is found that efile 210 contains a security marking, error correction occurs, (Step 122), the data is filtered, converted to sensible audio and/or video output data, and ultimately transmitted to the user at his/her computer(Step 124).

Figure 32:
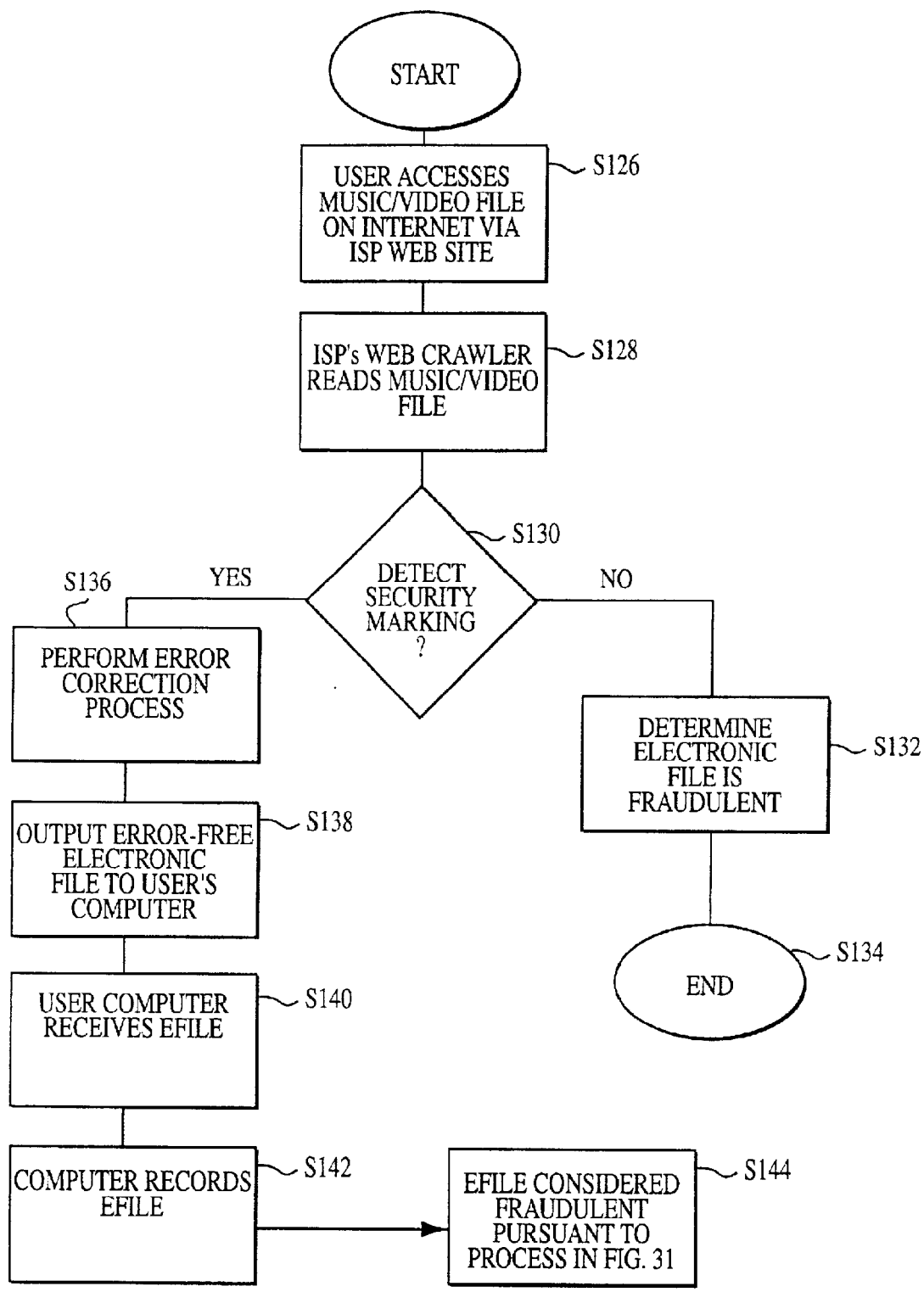
FIG. 32 illustrates a flow chart of the decision logic describing the authentication process of an electronic audio/video data file, containing the security marking of the present invention, retrieved via the Internet for copying.

FIG. 32 illustrates a flow chart of the decision logic describing the authentication process of an electronic audio/video data file, containing the security marking of the present invention, retrieved via the Internet for copying. The process begins at Step 126 (S126) when a user accesses music and/or file(s) on the Internet via an ISP's web site 214. The ISP's decoder web crawler 218 begins reading the efile 210 (Step 128) looking for one or more security markings (Step 130). If no security marking(s) is/are found, efile 210 is determined to be fraudulent (Step 132), and efile 210 is not transmitted to the user; the process ends (Step 134). Thus, unauthorized access is prevented.

On the other hand, if it is found that efile 210 contains a security marking, error correction occurs (Step 136), the data is filtered, converted to, for example, audio and/or video output data, and ultimately transmitted to the user (Step 138). The user's computer receives efile 210, (Step 140) at which point a user may record the efile 120 (Step 142). This efile 210 is considered fraudulent for purposes of future Internet use (S144), pursuant to the process outlined in FIG. 31, because it does not contain a security marking for subsequent authentication.

Figure 33:
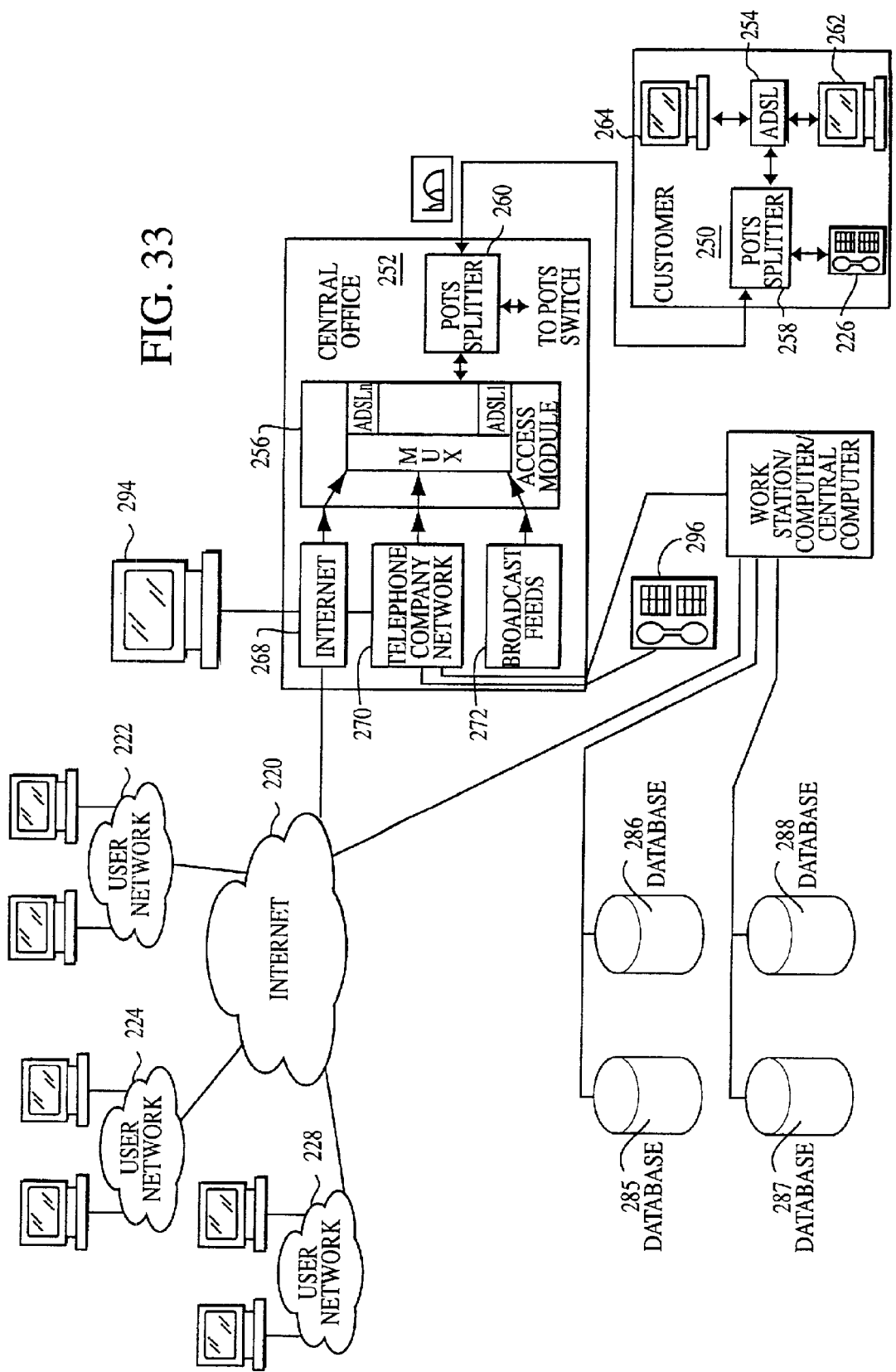
FIG. 33 is an illustration of the architecture of the combined Internet, POTS, and ADSL architecture for use with a product manufactured according to the present invention in accordance with another embodiment.

FIG. 33 is an illustration of the architecture of the combined Internet, POTS, and ADSL architecture for use in the present invention in accordance with another embodiment. In FIG. 33, to preserve POTS and to prevent a fault in the ADSL equipment 254, 256 from compromising analog voice traffic 226, 296 the voice part of the spectrum (the lowest 4 kHz) is optionally separated from the rest by a passive filter, called a POTS splitter 258, 260. The rest of the available bandwidth (from about 10 kHz to 1 MHZ) carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADLS makes use of advanced modulation techniques, of which the best known is the discrete multitone technology (DST). As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream out of one of the 6-MHZ television channels that occupy spectrum above 50 MHZ (and more likely 550 MHz) and carve an upstream channel out of the 5–50 MHZ band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The Internet architecture 220 and ADSL architecture 254, 256 may also be combined with, for example, user networks 222, 224, 228. As illustrated in this embodiment, users may access or use or participate in the administration, or management computer assisted program in computer 240 via various different access methods. In this embodiment, the various databases 285, 286, 287 and/or 288, which may be used to store content, data and the like, are accessible via access to and/or by computer system 240, and/or via Internet/local area network 220.

The above embodiments are only to be construed as examples of the various different types of computer systems that may be utilized in connection with the computer-assisted and/or -implement process of the present invention.

Further, while the above description has focused on introducing a tracing substance into a polycarbonate composition that is manufactured into a specific media, such as a CD, the security marking system of the present invention may also be used as a marking technique for a digital bit stream that is in the process of being transmitted from an originating area or device to a destination device. In this situation, the digital bit stream would be marked with a specific code responsive to the embedded markings on the data disc that were detected via one or more of the above processes. Alternatively, or in addition, the derived security marking may be required to be uncoded, or may be used as an authentication in an encryption algorithm to derive the specific data associated with the tracking of the data disc and/or to determine whether the CD is, in fact, authentic.

Moreover, the exemplary authentication process disclosed herein may be used with the security marking system of the present invention to authenticate a data stream or collection of data, as opposed to, or in addition to, authenticating a specific media that has been used to play the data.

The many features and advantages of the invention are apparent from the detailed specification. Thus, it is intended by the appended claims to cover all such features and advantages of the invention that fall within the true spirit and scope of the invention.

Further, since numerous modifications and variations will readily occur to those skilled in the art, it is not desired to limit the invention to the exact construction illustrated and described. Accordingly, all suitable modifications and equivalents may be resorted to as falling within the scope of the invention.

We claim:

1. A method of marking a protective layer of a product at least one of comprised of and including a portion of polymer, said method used to track said product and inhibit at least one of piracy, unauthorized access and unauthorized copying of said product, said method comprising the steps of:

(a) introducing at least one predetermined tracing substance as a predetermined marking in a polycarbonate material of the polymer of the protective layer of the product in quantities that will not adversely effect at least one of performance, structure of, and the data stored on, the product, the tracing substance being indicative product information; and (b) manufacturing the product with the at least one predetermined tracing substance introduced therein in said introducing step (a).

2. A system of marking a protective layer of product at least one of comprised of and including a portion of polymer, said system used to track said product and inhibit at least one of piracy, unauthorized access and unauthorized copying of said product, comprising:

means for introducing at least one predetermined tracing substance as a predetermined marking in a polycarbonate material of the polymer of the protective layer of the product in quantities that will not adversely effect at least one of performance, structure of, and the data stored on, the product, the tracing substance being indicative of product information; and means for manufacturing the product with the at least one predetermined tracing substance introduced therein by said means for introducing.

3. A system of marking a product at least one of comprised of and including a portion of polymer, said system used to track said product and inhibit at least one of piracy, unauthorized access and unauthorized copying of said product, comprising:

a substance introduction system introducing at least one predetermined tracing substance as a predetermined marking in a polycarbonate material of the polymer of the product in quantities that will not adversely effect at least one of performance, structure of, and the data stored on, the product, the tracing substance being indicative of product information; and a product manufacturing system, operatively connected and structurally responsive to said substance introduction system, and manufacturing the product with the at least one predetermined tracing substance introduced therein by said substance introduction system.

4. In a security marking method for marking polycarbonate-based product to inhibit at least one of piracy, unauthorized access and unauthorized copying of said product, at least one of tracking and authenticating a data message impregnated with at least one predetermined tracing substance providing the security marking used for at least one of tracking and authenticating said data message, the at least one predetermined tracing substance including predetermined concentration amounts of at least an isotope, a plurality of isotopes and a plurality of stable isotopes, and the predetermined tracing substance indicative of product information including at least two of a lot number, batch number, shipper, recipient, shipping date, manufacturer identity, manufacturing date and designated product purpose.

5. The method of claim 1, wherein the at least one tracing substance comprises a transparent oxide of at least one of a silicate, a lead dioxide, tin, cadmium 12 and iridium 5, or a combination thereof.

6. The method of claim 1, wherein said introducing step (a) further comprises the step of introducing the at least one predetermined tracing substance as a security marking in the polycarbonate material including predetermined amounts of at least one of an isotope, a plurality of isotopes and a plurality of stable isotopes.

7. The method of claim 1, wherein the at least one predetermined tracing substance comprises at least two predetermined tracing substances, and wherein said introducing step (a) further comprises the step of introducing the at least two predetermined tracing substances as a security marking in the polycarbonate material including predetermined concentration amounts of at least one of an isotope, a plurality of isotopes and a plurality of stable isotopes.

8. The method of claim 1, further comprising a step of identifying by inspecting the product for the at least one tracing substance for tracking purposes.

9. The method of claim 6, further comprising identifying by inspecting the product for the at least one tracing substance including the predetermined amounts of the at least one of the isotope, the plurality of isotopes and the plurality of stable isotopes for tracking purposes.

10. The method of claim 6, further comprising a step of identifying by inspecting the product for the at least one tracing substance responsive to a ratio of concentration amounts in said product, for tracking purposes.

11. The method of claim 8, wherein said identifying step further comprises using at least one of mass spectrometry, neutron absorption and neutron spectrometry techniques.

12. The system of claim 2, wherein the at least one tracing substance comprises a transparent oxide of at least one of a silicate, a lead dioxide, tin, cadmium 12 and iridium 5, or a combination thereof.

13. The system of claim 3, wherein the at least one tracing substance comprises a transparent oxide of at least one of a silicate, a lead dioxide, tin, cadmium 12 and iridium 5, or a combination thereof.

14. The method of claim 4, wherein the at least one tracing substance comprises a transparent oxide of at least one of a silicate, a lead dioxide, tin, cadmium 12 and iridium 5, or a combination thereof.

15. The method of claim 4, further comprising a step of identifying by inspecting the product for the at least one tracing substance for tracking purposes.

16. The method of claim 4, further comprising identifying by inspecting the product for the at least one tracing substance including the predetermined amounts of the at least one of the isotope, the plurality of isotopes and the plurality of stable isotopes for tracking purposes.

17. The method of claim 4, further comprising a step of identifying by inspecting the product for the at least one tracing substance responsive to a ratio of concentration amounts in said product, for tracking purposes.

* * * * *